(12) United States Patent
King et al.

(10) Patent No.: US 8,514,221 B2
(45) Date of Patent: *Aug. 20, 2013

(54) WORKING WITH 3D OBJECTS

(75) Inventors: Nicholas V. King, San Jose, CA (US); Todd Benjamin, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,624

(22) Filed: Jul. 9, 2012

(65) Prior Publication Data

US 2012/0268410 A1 Oct. 25, 2012

Related U.S. Application Data

(63) Continuation of application No. 12/652,721, filed on Jan. 5, 2010, now Pat. No. 8,232,990.

(51) Int. Cl.
*G06T 15/00* (2011.01)

(52) U.S. Cl.
USPC ........... 345/419; 345/157; 345/158; 345/173; 345/650; 345/653; 382/203; 341/20

(58) Field of Classification Search
USPC ................. 345/419, 157, 158, 173, 175, 650; 345/653; 382/203; 341/20
See application file for complete search history.

(56) References Cited

U.S. PATENT DOCUMENTS

| | | | |
|---|---|---|---|
| 6,222,465 B1 | 4/2001 | Kumar et al. | |
| 6,323,846 B1 | 11/2001 | Westerman et al. | |
| 6,888,536 B2 | 5/2005 | Westerman et al. | |
| 7,212,197 B1 | 5/2007 | Schkolne et al. | |
| 7,330,198 B2 | 2/2008 | Yamaguchi et al. | |
| 7,468,742 B2 | 12/2008 | Ahn et al. | |
| 7,519,223 B2 | 4/2009 | Dehlin et al. | |
| 7,696,998 B2 | 4/2010 | Bae | |
| 7,750,911 B2 | 7/2010 | Bae | |
| 7,755,608 B2 | 7/2010 | Chang et al. | |
| 8,035,614 B2 | 10/2011 | Bell et al. | |
| 8,232,990 B2 * | 7/2012 | King et al. | 345/419 |
| 2008/0231926 A1 | 9/2008 | Klug et al. | |
| 2009/0079734 A1 | 3/2009 | McDaniel | |
| 2009/0303231 A1 | 12/2009 | Robinet et al. | |

OTHER PUBLICATIONS

Celentano et al., "Gesture, Shapes and Multitouch Interaction," IEEE 19th International Conference on Database and Expert Systems Application, 2008, pp. 137-141.

Fukutake et al., "Voice and Gesture Based 3D Multimedia Presentation Tool," Proceeding of SPIE, vol. 6777, 2007, pp. 1-12.

Lapides et al., "The 3D Tractus: A Three-Dimensional Drawing Board," IEEE Tabletop 2006, pp. 1-8.

(Continued)

*Primary Examiner* — Phu K Nguyen

(74) *Attorney, Agent, or Firm* — Morgan, Lewis & Bockius LLP

(57) ABSTRACT

Three-dimensional objects can be generated based on two-dimensional objects. A first user input identifying a 2D object presented in a user interface can be detected, and a second user input including a 3D gesture input that includes a movement in proximity to a surface can be detected. A 3D object can be generated based on the 2D object according to the first and second user inputs, and the 3D object can be presented in the user interface.

31 Claims, 21 Drawing Sheets

(56) References Cited

OTHER PUBLICATIONS

Lee, M. "The art of capacitive touch sensing". Planet Analog. [online], [retrieved on Jan. 7, 2010]. Retrieved from the Internet <URL: http://www.planetanalog.com/showArticle?articleID=181401898>. Published Mar. 1, 2006, 5 pages.

Nishino, et al., "Making 3D Objects through Bimanual Actions" *Systems, Man, and Cybernetics*, 1998. 1998 IEEE International Conference, Oct. 11-14, 1998, vol. 4, pp. 3590-3595.

O'Hagan et al., "Visual Gesture Interfaces for Virtual Environments," IEEE User Interface Conference, Jan. 2000, pp. 73-80.

Osoinach, B. "Proximity Capacitative Sensor Technology for Touch Sensing Applications," 2008. Published by Freescale Semiconductor, Tempe, Arizona, pp. 1-12.

* cited by examiner

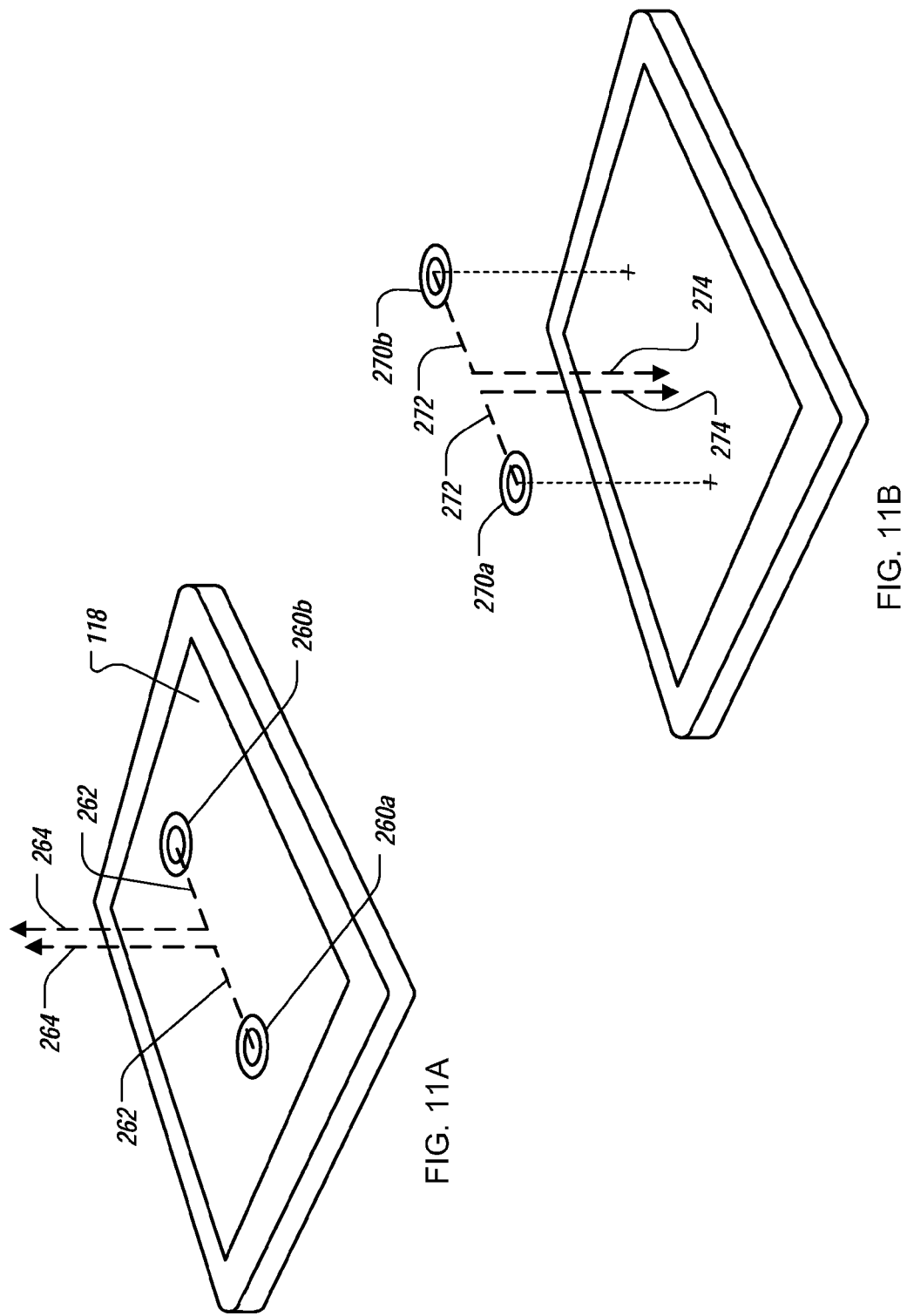

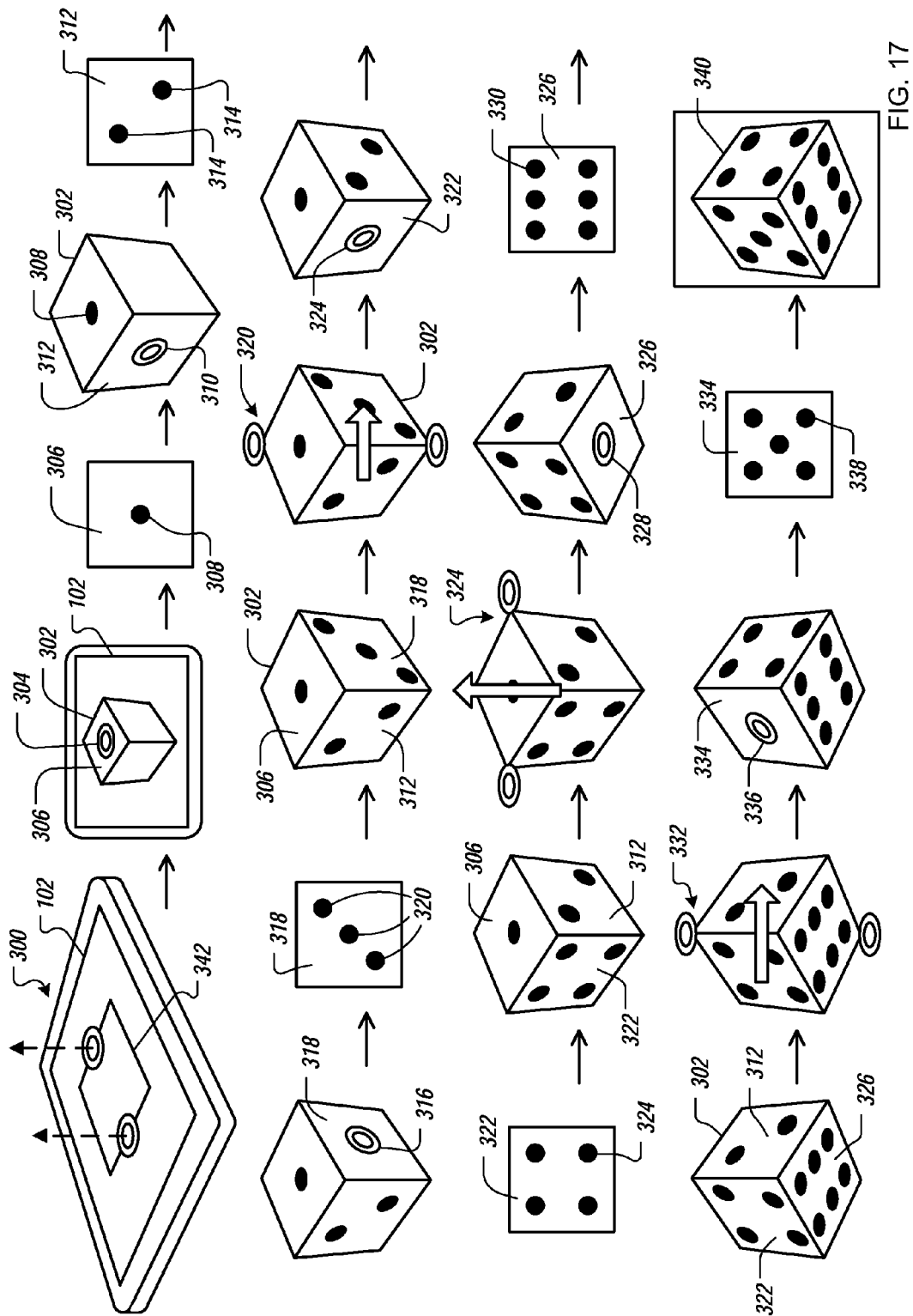

WORKING WITH 3D OBJECTS

CROSS REFERENCE TO RELATED APPLICATIONS

This is a continuation of and claims priority to U.S. patent application Ser. No. 12/652,721, filed on Jan. 5, 2010, the content of which is incorporated herein by reference.

TECHNICAL FIELD

This subject matter is generally related to working with 3D objects.

BACKGROUND

Computer assisted design (CAD) software allows users to generate and manipulate two-dimensional (2D) and three-dimensional (3D) objects. A user can interact with a CAD program using various peripheral input devices, such as a keyboard, a computer mouse, a trackball, a touchpad, a touch-sensitive pad, and/or a touch-sensitive display. The CAD program may provide various software tools for generating and manipulating 2D and 3D objects.

The CAD program may provide a drafting area showing 2D or 3D objects being processed by the user, and menus outside the drafting area for allowing the user to choose from various tools in generating or modifying 2D or 3D objects. For example, there may be menus for 2D object templates, 3D object templates, paint brush options, eraser options, line options, color options, texture options, options for rotating or resizing the objects, and so forth. The user may select a tool from one of the menus and use the selected tool to manipulate the 2D or 3D object.

SUMMARY

Techniques and systems that support generating, modifying, and manipulating 3D objects using 3D gesture inputs are disclosed. For example, 3D objects can be generated based on 2D objects. A first user input identifying a 2D object presented in a user interface can be detected, and a second 3D gesture input that includes a movement in proximity to a surface can be detected. A 3D object can be generated based on the 2D object according to the first and second user inputs, and the 3D object can be presented in the user interface where the 3D object can be manipulated by the user.

Three-dimensional objects can be modified using 3D gesture inputs. For example, a 3D object shown on a touch-sensitive display can be detected, and a 3D gesture input that includes a movement of a finger or a pointing device in proximity to a surface of the touch-sensitive display can be detected. Detecting the 3D gesture input can include measuring a distance between the finger or the pointing device and a surface of the display. The 3D object can be modified according to the 3D gesture input, and the updated 3D object can be shown on the touch-sensitive display.

For example, a first user input that includes at least one of a touch input or a two-dimensional (2D) gesture input can be detected, and a 3D gesture input that includes a movement in proximity to a surface can be detected. A 3D object can be generated in a user interface based on the 3D gesture input and at least one of the touch input or 2D gesture input.

An apparatus for generating or modifying 3D objects can include a touch sensor to detect touch inputs and 2D gesture inputs that are associated with a surface, and a proximity sensor in combination with the touch sensor to detect 3D gesture inputs, each 3D gesture input including a movement in proximity to the surface. A data processor is provided to receive signals output from the touch sensor and the proximity sensor, the signals representing detected 3D gesture inputs and at least one of detected touch inputs or detected 2D gesture inputs. The data processor generates or modifies a 3D object in a user interface according to the detected 3D gesture inputs and at least one of detected touch inputs or detected 2D gesture inputs.

An apparatus for generating or modifying 3D objects can include a sensor to detect touch inputs, 2D gesture inputs that are associated with a surface, and 3D gesture inputs that include a movement perpendicular to the surface. A data processor is provided to receive signals output from the sensor, the signals representing detected 3D gesture inputs and at least one of detected touch inputs or detected 2D gesture inputs. The data processor generates or modifies a 3D object in a user interface according to the detected 3D gesture inputs and at least one of detected touch inputs or detected 2D gesture inputs.

These features allow a user to quickly and intuitively generate, modify, and manipulate 3D objects and virtual 3D environments.

DESCRIPTION OF DRAWINGS

FIGS. 3A to 20 show exemplary 3D gesture inputs and 3D objects that are generated or modified based on the 3D gesture inputs according to various embodiments of the invention.

DETAILED DESCRIPTION

Device Overview

A device having a touch-sensitive display that enables a user to generate and manipulate 3D objects using 3D gesture inputs is disclosed. The device has touch sensors that can sense positions and movements of objects contacting a surface of the display, and proximity sensors that can sense positions and movements of objects in a three-dimensional space in the vicinity of the display surface (including movements in proximity to, but not actually touching, the display surface). The touch sensors can be sensitive to haptic and/or tactile contact with a user, and map touch positions and finger movements to predefined touch inputs and 2D gesture inputs, respectively. The proximity sensors can sense movements of a user's fingers or pointing devices in three-dimensional space, and map the movements to predefined 3D gesture inputs. In some implementations, the touch sensors and the proximity sensors can be the same sensors that detect touch, 2D, or 3D inputs depending on finger movements and positions relative to the display surface. The touch inputs, 2D gesture inputs, and 3D gesture inputs can be used by application programs to trigger events, such as applying certain transformations to objects, allowing the user to generate and manipulate 3D objects quickly and intuitively.

Figure 1:
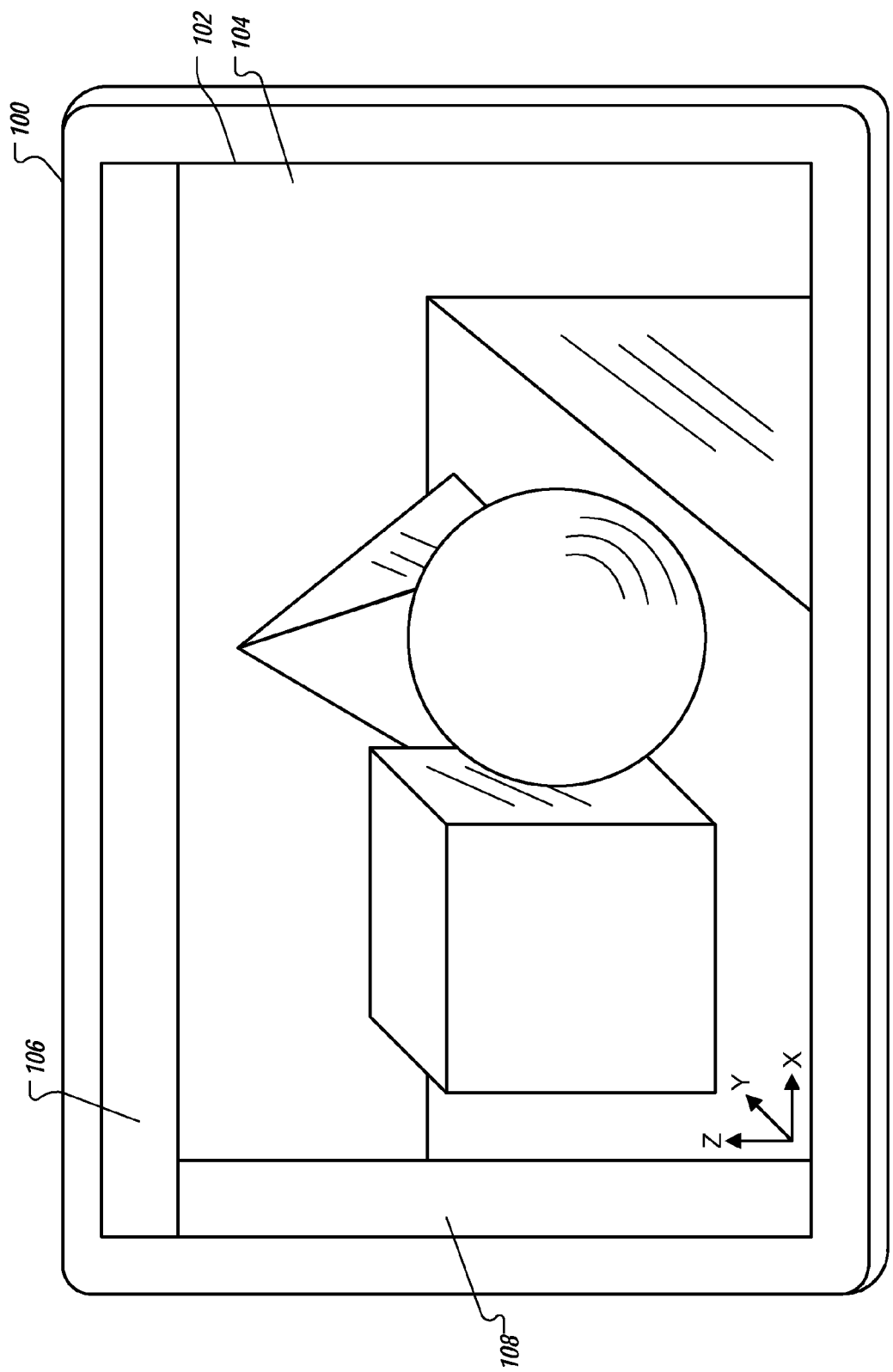
FIG. 1 is a diagram of a device that is responsive to 3D gesture inputs.

Referring to FIG. 1, in some implementations, device 100 can include touch-sensitive display 102 that is responsive to touch inputs, 2D gesture inputs, and 3D gesture inputs. An application program, such as a CAD program, can be executed on device 100 to enable a user to generate and manipulate 2D and 3D objects. The CAD program may provide a graphical user interface having drafting area 104 for showing the objects, and menu area 106 having user-selectable menus. Device 100 can be, for example, a computer, a tablet computer, a handheld computer, a personal digital assistant, a cellular telephone, a network appliance, a camera, a smart phone, an enhanced general packet radio service (EGPRS) mobile phone, a network base station, a media player, a navigation device, an email device, a game console, a laptop computer, or a combination of any two or more of these data processing devices or other data processing devices.

In some implementations, the user interface may include input area 108 that is logically separated from drafting area 104, in which each of areas 104 and 108 can independently receive touch and gesture inputs. Input area 108 can be any region on display 102 that is designated by the operating system or application program to be the input area. By providing input area 108, the user may input two or more multi-touch or gesture inputs at the same time. For example, the left hand may provide one gesture input in input area 108, and the right hand may provide another gesture input in drafting area 104. Some gesture inputs may require inputs from both hands, so having a separate input area 108 allows the CAD program to determine whether the movements from multiple fingers correspond to two different gesture inputs or a single gesture input. Additional input areas can be provided, for example, to enable multiple users to process objects simultaneously, with each person possibly providing multiple gestures at the same time.

In the description below, the 3D gesture inputs are described in terms of the movements of the user's fingers. The user can also provide 3D gesture inputs using other pointing devices, such as styluses, or a combination of fingers and pointing devices. For example, the user may use the left hand fingers in combination with a stylus held in the right hand to provide 3D gesture inputs.

Device 100 is intuitive to use because objects can be shown in drafting area 104, and the user can touch and manipulate the objects directly on the display (as compared to indirectly interacting with a separate touch-pad). In some implementations, the CAD program allows the user to generate 3D objects from 2D objects. For example, a user can generate a 2D object using a multi-touch input, then lift the fingers simultaneously to extrude the 2D object to form a 3D object.

The following describes examples of generating 3D objects using touch and gesture inputs. In some implementations, the operating system of device 100 may have a touch model (which may include, for example, a standard touch and gesture input dictionary) that is used by the application programs executing on device 100. Each application program may have its own touch model (which may include, for example, the application's touch and gesture input dictionary), and users may define their own touch models (which may include, for example, the users' custom touch and gesture input dictionaries). Touch and gesture inputs other than those described below can also be used.

Generating, Modifying, and Manipulating 3D Objects Using 3D Gesture Inputs

Figure 2C:
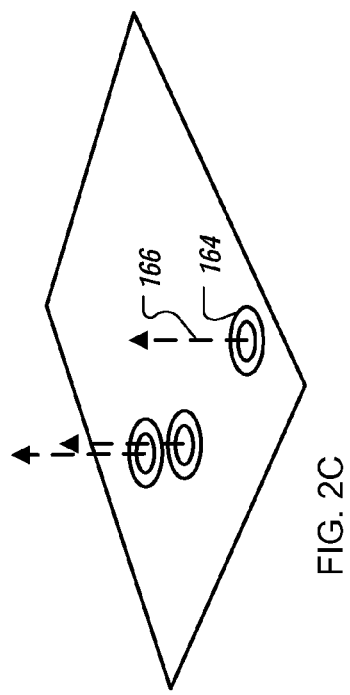
FIG. 2C shows an example representation of a 3D gesture input.
Figure 2B:
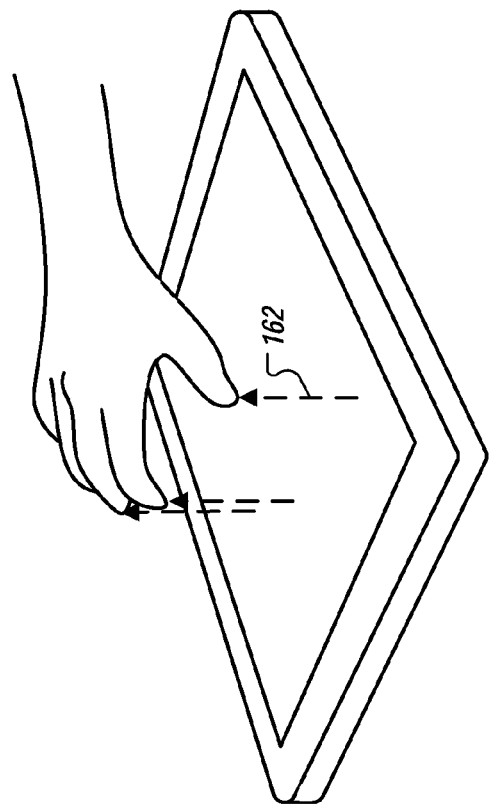
FIGS. 2A and 2B show an example 3D gesture input.
Figure 2A:
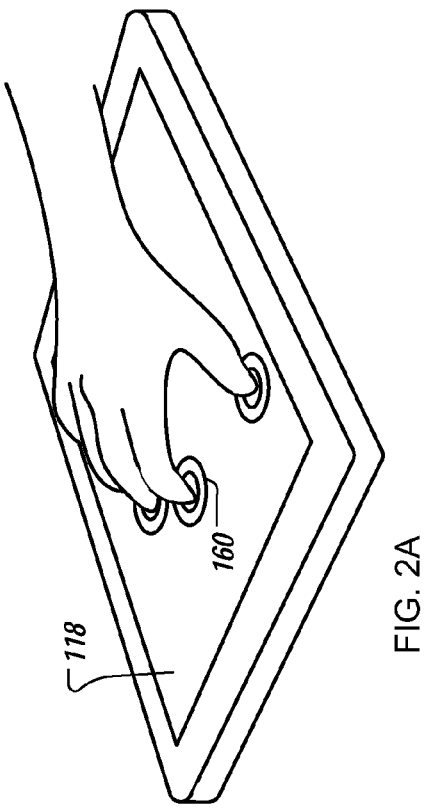

Referring to FIGS. 2A and 2B, one type of 3D gesture input can include touching display surface 118 at multiple touch points 160 and pulling up 162 the fingers for a distance. Referring to 2C, the 3D gesture input shown in FIGS. 2A and 2B will be represented by double circles 164 indicating touch points on display 102 and dashed lines 166 indicating movements of the fingers or pointing devices.

Figures 3A, 3B:
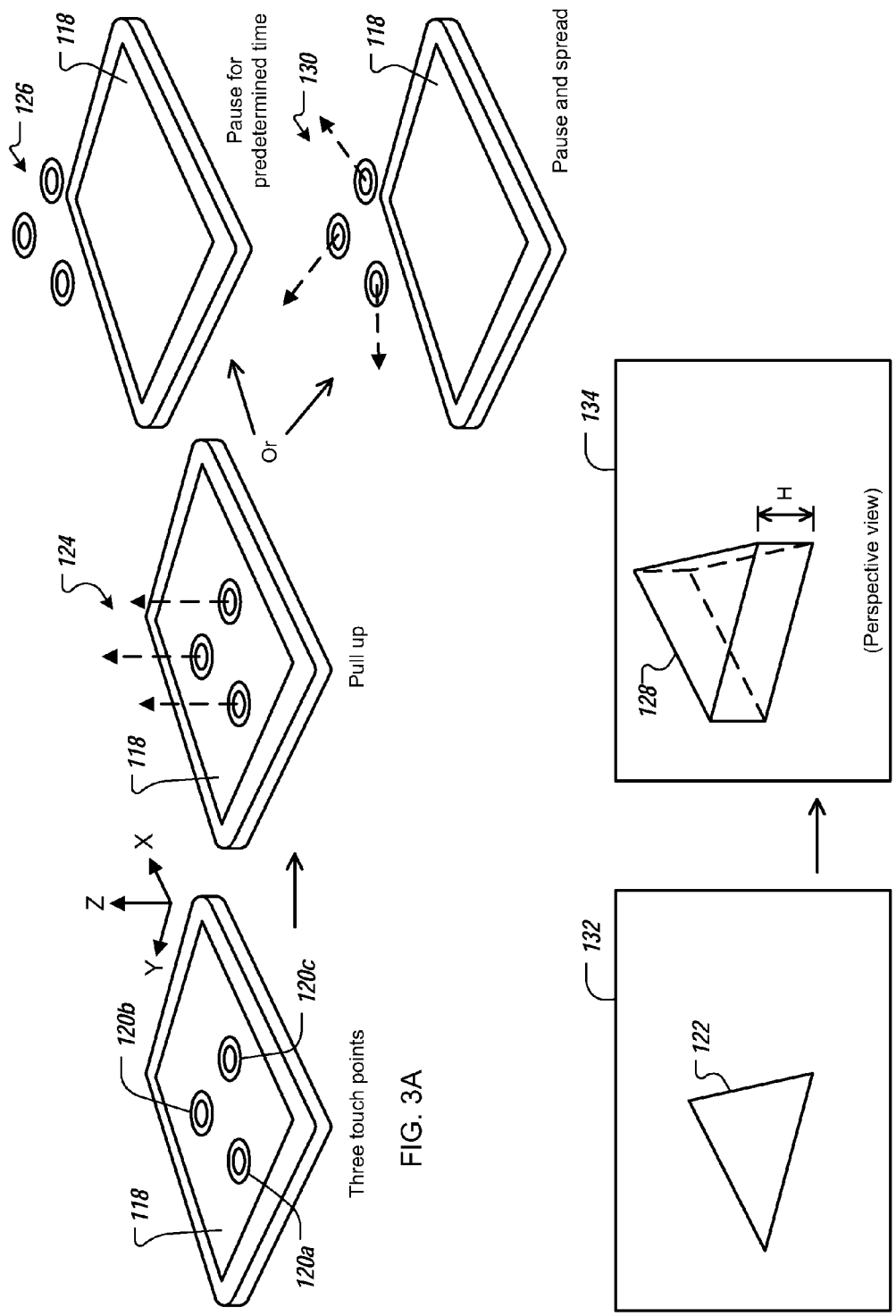

Referring to FIGS. 3A and 3B, a user can generate triangular prism 128 based on triangle 122. FIG. 3A shows a sequence of finger movements that defines a 3D gesture input for generating triangular prism 128. FIG. 3B shows graph 132 that includes triangle 122 and graph 134 that includes triangular prism 128, which the user sees on display 102. The user can generate triangle 122 by using three fingers to touch display surface 118 at three touch points 120a, 120b, and 120c. The user lifts or pulls up 124 the three fingers substantially perpendicular to the surface at substantially the same time to a distance from display surface 118, and pauses 126 for at least a predetermined time (for example, one second). These movements indicate a 3D gesture input that is associated with extrusion of triangle 122, resulting in triangular prism 128 having a cross section that corresponds to triangle 122. The height H (or thickness) of triangular prism 128 is proportional to the amount of movement of the fingertips perpendicular to the surface. In some implementations, an application program (e.g., a CAD program) can configure a touch model in the system to that 3D gestures can be detected. The touch model can have an Application Programming Interface (API) that can be used by the application to receive 2D or 3D touch events and use those touch events to perform actions, such as rendering a 2D object into a 3D object on a display.

When the user pulls up the fingers to extrude triangle 122, the user will initially see a top view of triangular prism 128, which can be rotated to show a perspective view of triangular prism 128, as shown in graph 134.

There can be more than one way to indicate the end of a 3D gesture input. For example, rather than pausing for at least the predetermined period of time, the operating system or the CAD program can be configured to recognize the end phase by detecting a short pause followed by spreading out of the fingertips (or moving the fingertips in the horizontal direction), as represented by movements 130. In movements 130, the fingertips may pause for less than the predetermined period of time and may allow the user to complete the 3D gesture input faster.

In some implementations, the beginning and ending of each 3D gesture input can be defined by certain actions received in input area 108. For example, touching the input area 108 may indicate the start of a 3D gesture input, maintaining the tactile contact with display surface 118 may indicate continuation of the 3D gesture input, and moving the finger away from the input area 108 may indicate the end of the 3D gesture input.

If a triangle has already been generated, the user can also touch the triangle to select the triangle, then pull up the fingers to extrude the selected triangle to form a triangular prism. The CAD program can be configured to recognize a 3D gesture input that includes touching a 2D object at two or more touch points followed by pulling up the fingers to indicate extrusion of the 2D object to generate a 3D object. When the user touches an object for a predetermined time (for example, 0.5 second), the CAD program can highlight the object to indicate that the object has been selected. The user can de-select the object by, for example, quickly moving the finger(s) away from the display surface at an angle less than a predetermined degree (for example, 60°) relative to display surface 118, or using other predefined gesture input associated with de-selection.

Figure 4A:
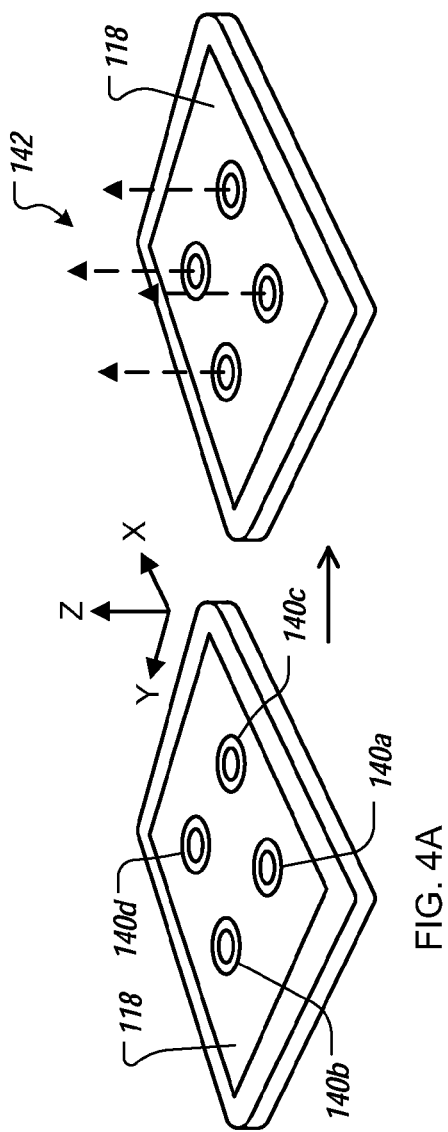
Figure 4B:
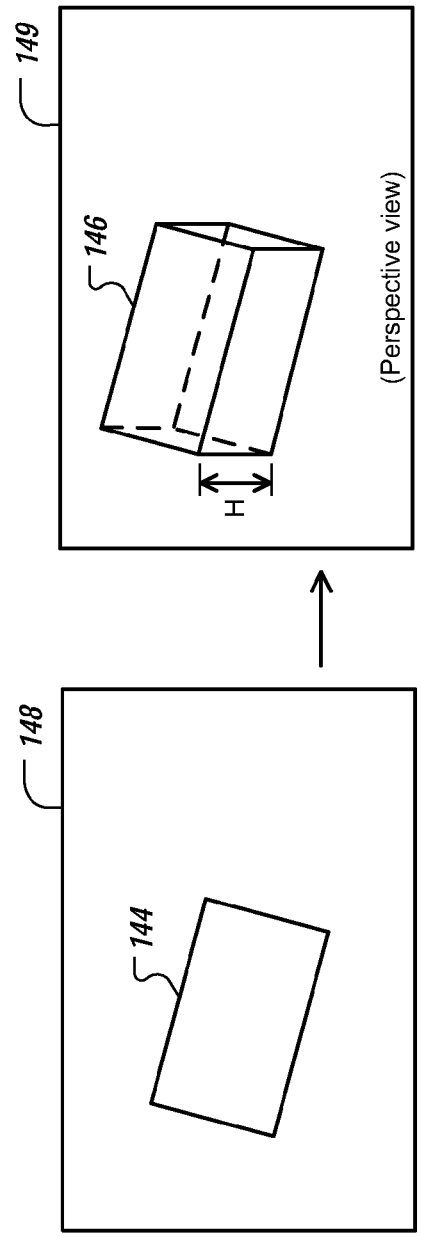

Referring to FIGS. 4A and 4B, a user can generate a cube or a rectangular prism by extruding a square or a rectangle, respectively. FIG. 4A shows a sequence of finger movements that defines a 3D gesture input for generating a rectangular prism. FIG. 4B shows graph 148 that includes rectangle 144 and graph 149 that includes rectangular prism 146, which the user sees on display 102. The user can generate rectangle 144 by providing four touch inputs, for example, by using four fingertips to touch display surface 118 at four touch points 140*a*, 140*b*, 140*c*, and 140*d*. The user lifts or pulls up 142 the four fingertips substantially perpendicular to surface 118 at substantially the same time to locations at a distance from display surface 118, and pauses for at least a predetermined time (or pause and spread out the fingers) to signal the end phase of this 3D gesture input.

Pulling up the four fingertips substantially perpendicular to surface 118 at substantially the same time and pausing for at least the predetermined time (or pause and spreading the four fingers) representing a 3D gesture input that indicates extrusion of rectangle 144 and resulting in a 3D rectangular prism 146 having a cross section that corresponds to rectangle 144. The height H (or thickness) of 3D rectangular prism 146 is proportional to the movement of the fingers perpendicular to surface 118.

When the user pulls up the fingers to extrude rectangle 144, the user will initially see a top view of rectangular prism 146, which can be rotated to obtain a perspective view of rectangular prism 146, as shown in graph 149.

Figure 5A:
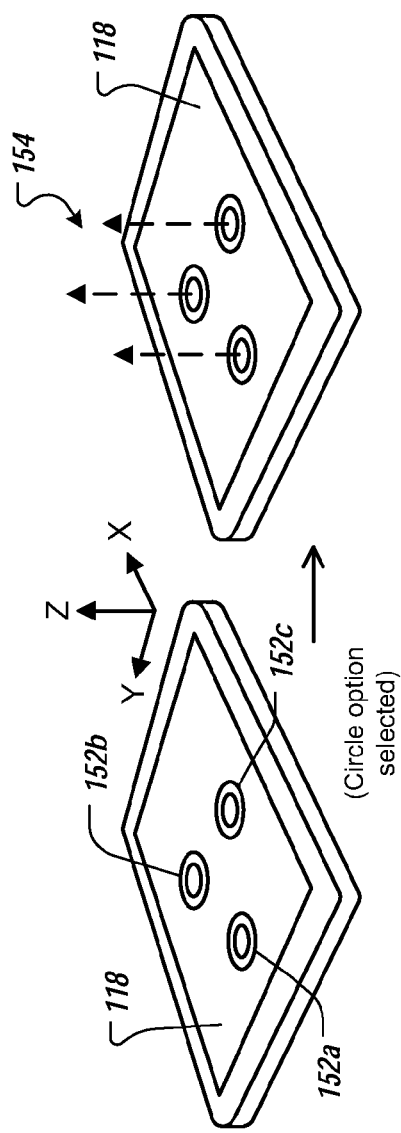
Figure 5B:
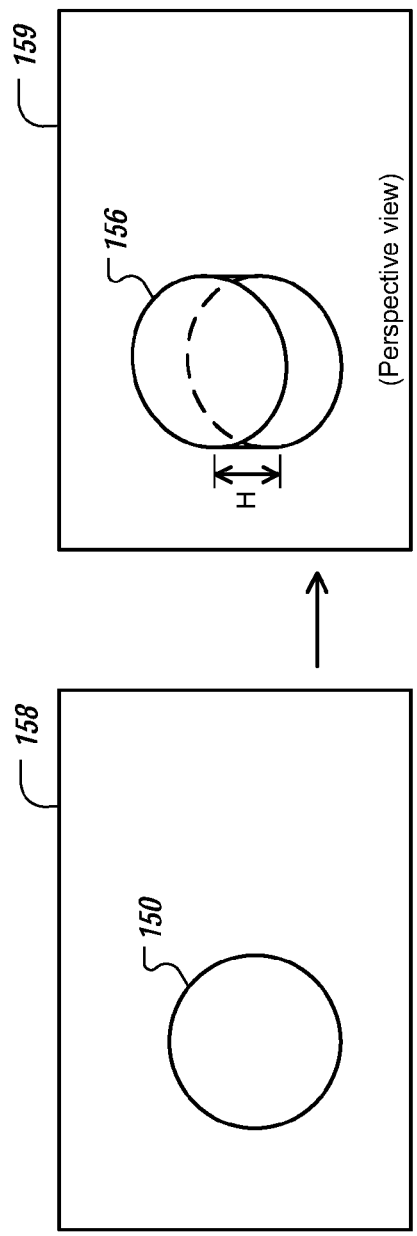

Referring to FIGS. 5A and 5B, a user can generate a cylinder by extruding a circle. FIG. 5A shows a sequence of finger movements that defines a 3D gesture input for generating a cylinder. FIG. 5B shows graph 158 that includes circle 150 and graph 159 that includes cylinder 156, which the user sees on display 102. In some implementations, the user can select a circle option from menus 106 (FIG. 1) and provide three touch inputs (for example, by using three fingertips to touch display surface 118 at three touch points 152*a*, 152*b*, and 152*c*). The CAD program can be configured such that when the circle option is selected and three touch inputs are received, the CAD program generates a circle that passes the three touch points. The user pulls up 154 the three fingertips substantially perpendicular to surface 118 at substantially the same time, and pauses the fingertips at a distance from the display surface 118 for at least a predetermined time (or pause and spread out the fingers) to signal the end phase of this 3D gesture input.

When the circle option is selected, pulling up the three fingertips substantially perpendicular to surface 118 at substantially the same time and pausing for at least the predetermined time (or pause and spreading the three fingers) represent a 3D gesture input that indicates extrusion of circle 150, resulting in 3D cylinder 156 having a cross section that corresponds to circle 150. The height H (or thickness) of cylinder 156 is proportional to the movement of the fingertips perpendicular to surface 118.

When the user pulls up the fingers to extrude circle 150, the user will initially see a top view of cylinder 156, which can be rotated to show a perspective view of cylinder 156, as shown in graph 159.

Figure 6A:
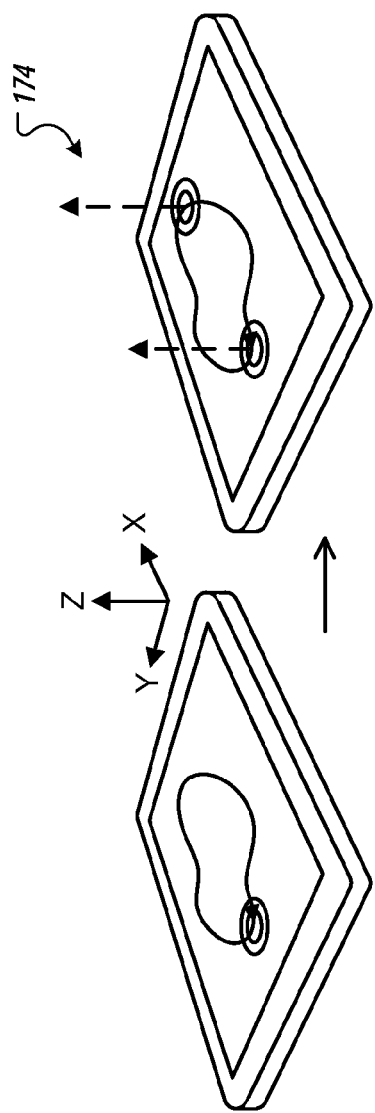
Figure 6B:
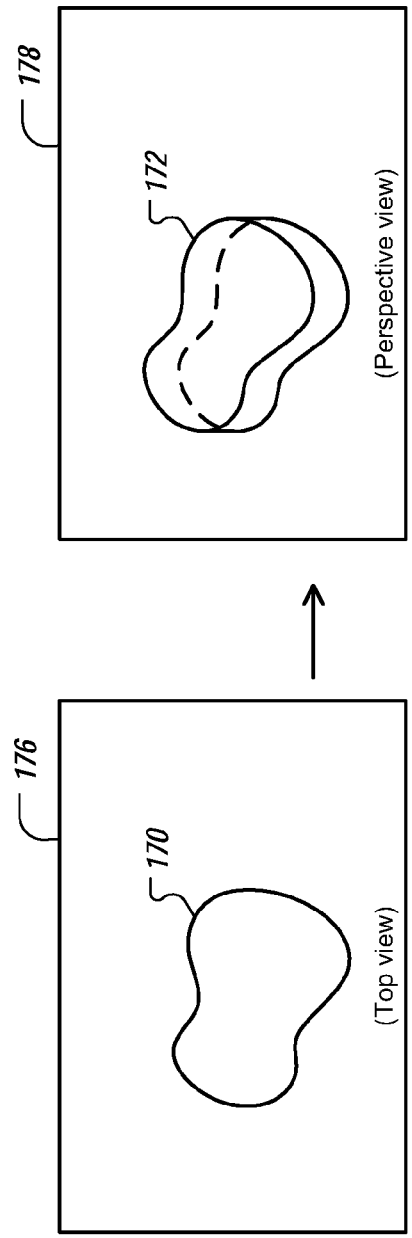

Referring to FIGS. 6A and 6B, a user can generate an extruded 3D object from an arbitrary shaped 2D object. FIG. 6A shows a sequence of finger movements that defines a 3D gesture input for generating a 3D object. FIG. 6B shows graph 176 that includes a 2D line drawing defining 2D object 170, and graph 178 that includes frustum 172 extruded from 2D object 170, as seen by the user on display 102. In some implementations, the user can select a freestyle line drawing option from menus 106 to draw arbitrary 2D object 170. The user touches 2D object 170 using two or more fingertips and pulls up 174 the fingertips substantially perpendicular to surface 118 at substantially the same time, and pauses the fingertips at a distance from the display surface 118 for at least a predetermined time (or pause and spread out the fingers) to signal the end phase of this 3D gesture input.

Touching 2D object 170 using two or more fingers, pulling up the fingers at substantially the same time, and pausing for at least the predetermined time (or pause and spreading the fingers) represent a 3D gesture input that indicates extrusion of 2D object 170, resulting in frustum 172 having a cross section that corresponds to 2D object 170. The height H (or thickness) of frustum 172 is proportional to the movement of the fingertips perpendicular to surface 118.

When the user pulls up the fingers to extrude 2D object 170, the user will initially see a top view of frustum 172, which can be rotated to show a perspective view of frustum 172, as shown in graph 178.

The CAD program may have additional functions to allow the user to further modify the frustum 172, such as modifying the flat top and/or bottom surface to form a curved surface, making portions of frustum 172 hollow, attaching other 3D objects to frustum 172. For example, frustum 172 can be the basis of a guitar body.

The CAD program may allow a user to select an object in a photograph and extrude the selected object to form a 3D object. This may allow a user to quickly generate, for example, 3D models of buildings from aerial photographs.

Figure 7A:
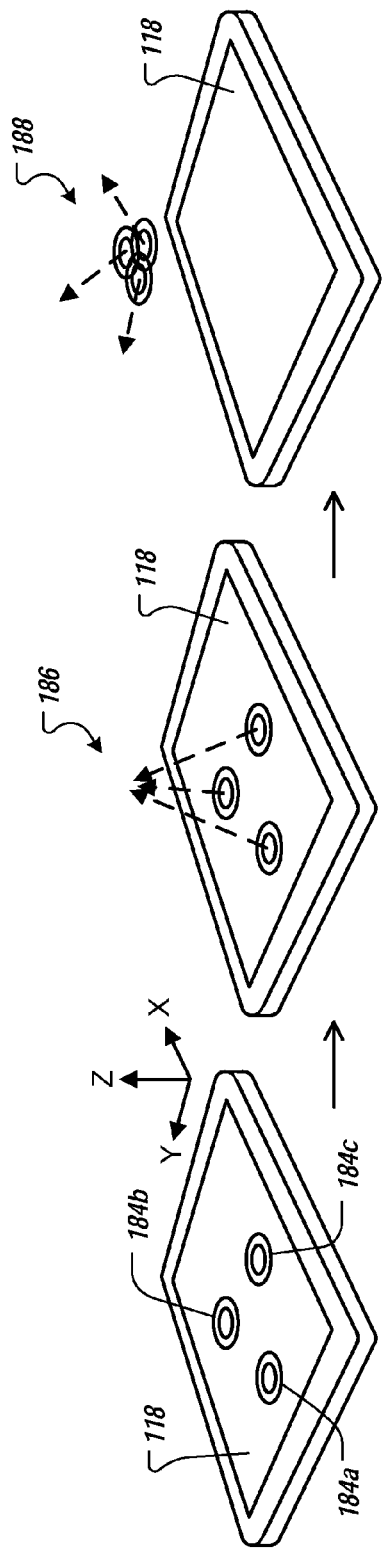
Figure 7B:
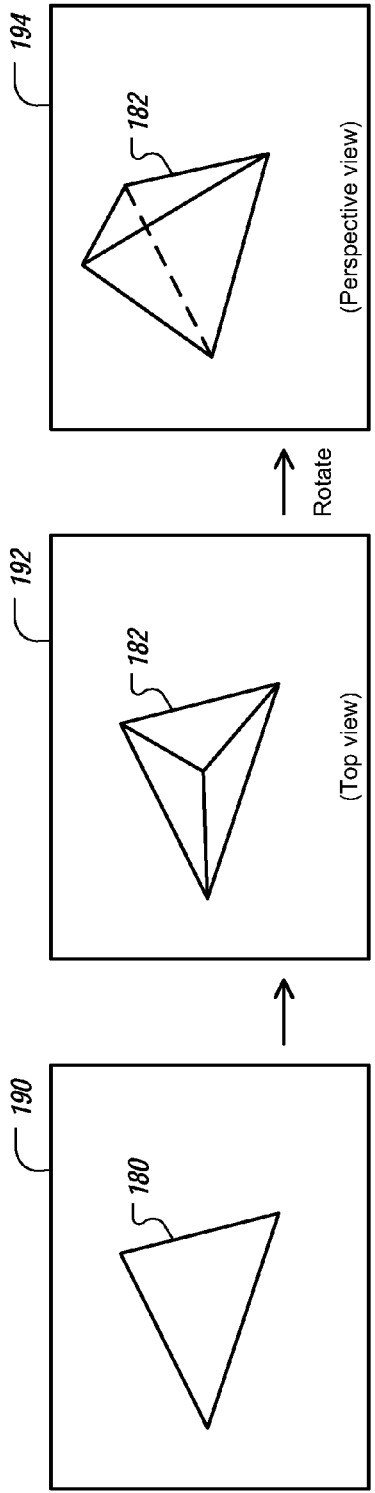

Referring to FIGS. 7A and 7B, a user can generate a pyramid with a triangular base from a triangle. FIG. 7A shows a sequence of finger movements that defines a 3D gesture input for generating a pyramid. FIG. 7B shows graph 190 that includes triangle 180, graph 192 that includes a top view of pyramid 182, and graph 194 that includes a perspective view of pyramid 182, as shown on display 102. The user can generate triangle 180 by using three fingers to touch display surface 118 at three touch points 184*a*, 184*b*, and 184*c*. The user lifts or pulls up 186 the three fingers at substantially the same time to a distance from display surface 118, while also drawing the three fingers together, pauses and spreads out 188 the fingers (or pauses for at least a predetermined period of time). These movements indicate a 3D gesture input that is associated with generating pyramid 182 from triangle 180, in which pyramid 182 has a bottom surface that corresponds to triangle 180. The height H (or thickness) of tetrahedron 182 is proportional to the amount of movement of the fingertips perpendicular to surface 118.

Figure 8A:
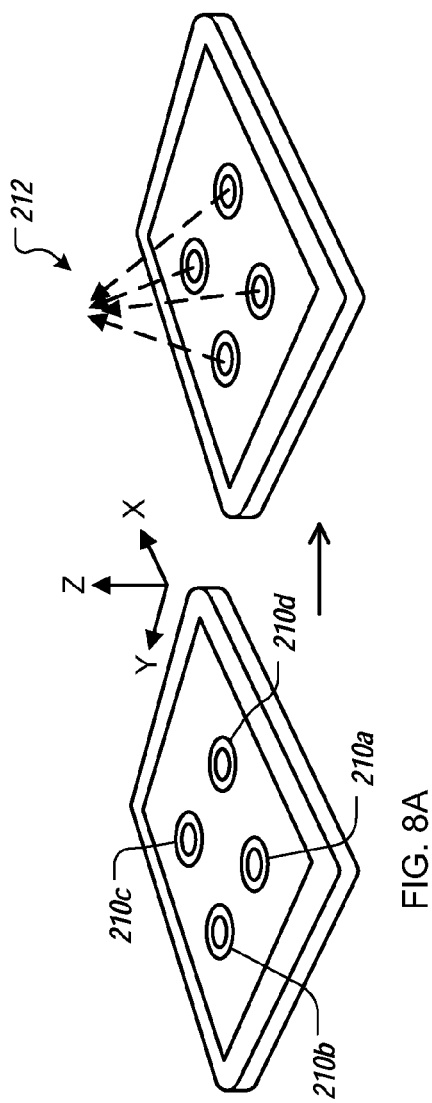
Figure 8B:
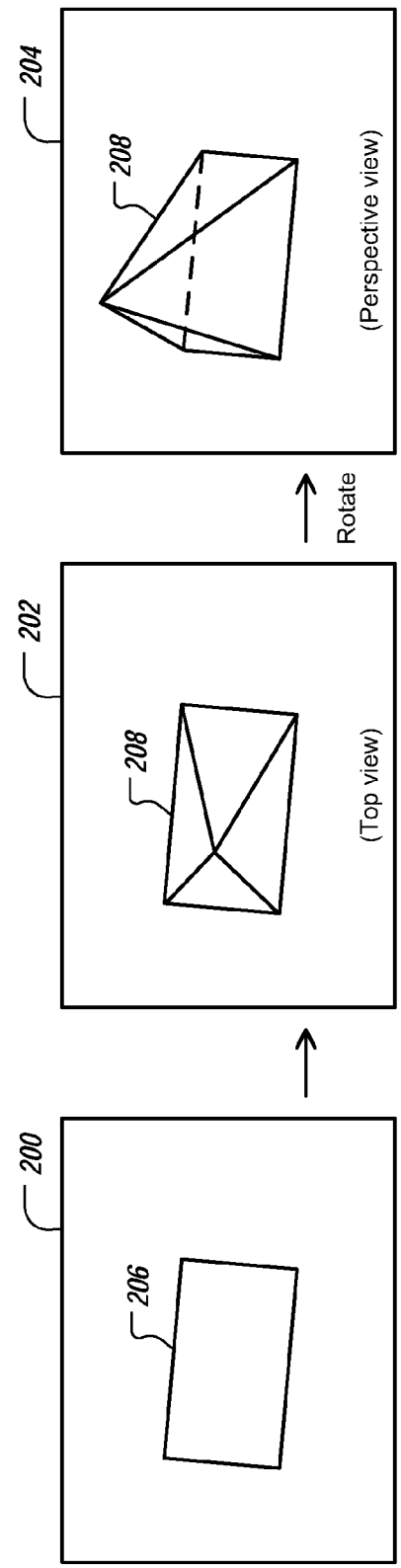

Referring to FIGS. 8A and 8B, a user can generate a pyramid with a rectangular base from a rectangle. FIG. 8A shows a sequence of finger movements that defines a 3D gesture input for generating a pyramid. FIG. 8B shows graph 200 that includes triangle 206, graph 202 that includes a top view of pyramid 208, and graph 204 that includes a perspective view of pyramid 208, as shown on display 102. The user can generate rectangle 206 by using four fingers to touch display surface 118 at four touch points 210*a*, 210*b*, 210*c*, and 210*d*. The user lifts or pulls up 212 the four fingers at substantially the same time to a distance from display surface 118, while also drawing the four fingers together, pauses and spreads out the fingers (or pauses for at least a predetermined period of time). These movements indicate a 3D gesture input that is associated with generating pyramid 208 from rectangle 206, in which pyramid 208 has a bottom surface that corresponds to rectangle 206. The height H (or thickness) of pyramid 208 is proportional to the amount of movement of the fingertips perpendicular to surface 118.

Figure 9A:
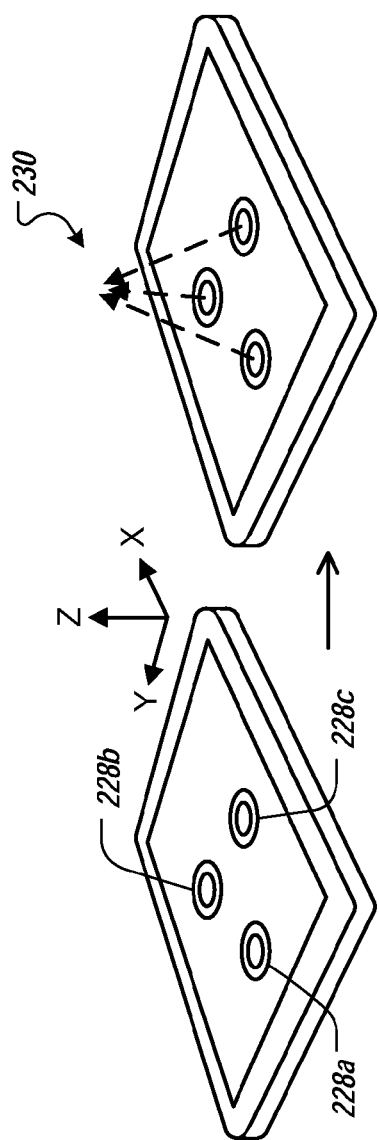
Figure 9B:
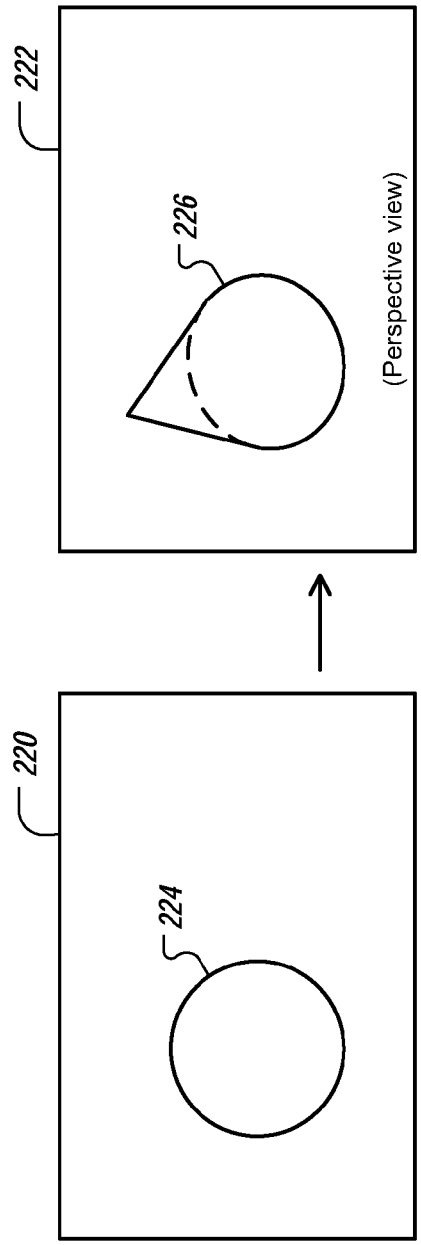

Referring to FIGS. 9A and 9B, a user can generate a cone from a circle. FIG. 9A shows a sequence of finger movements that defines a 3D gesture input for generating a cone. FIG. 9B shows graph 220 that includes circle 224 and graph 222 that includes a perspective view of cone 226, as shown on display 102. The user can generate circle 224 by selecting the circle option and providing a touch input having three touch points 228a, 228b, and 228c, similar to the method described in FIGS. 5A and 5B. The user lifts or pulls up 230 the three fingers at substantially the same time to a distance from display surface 118, while also drawing the three fingers together, pauses and spreads out the fingers (or pauses for at least a predetermined period of time). These movements indicate a 3D gesture input that is associated with generating cone 226 from circle 224, in which cone 226 has a bottom surface that corresponds to circle 224. The height H (or thickness) of cone 226 is proportional to the amount of movement of the fingertips perpendicular to surface 118.

Figure 10A:
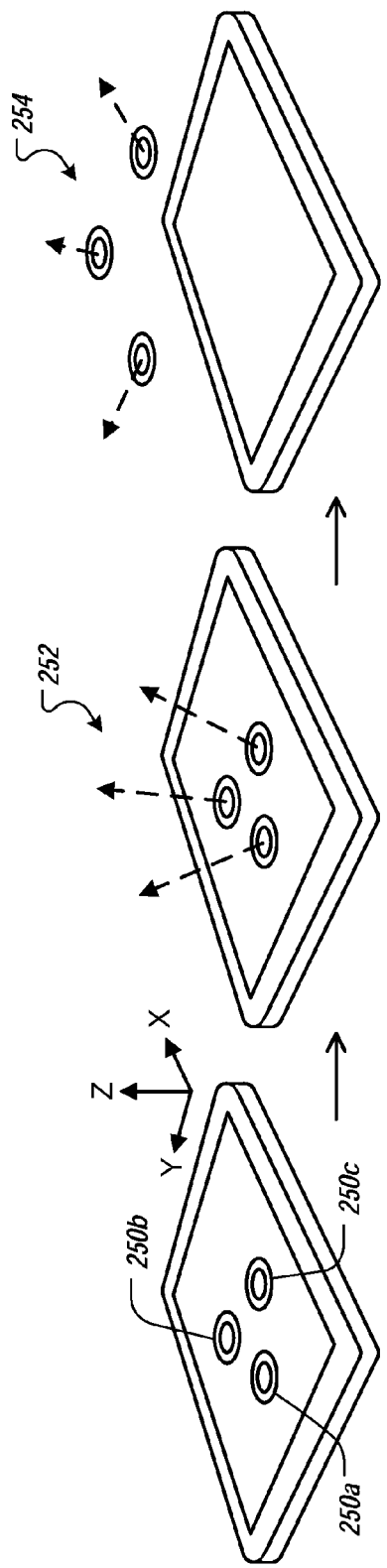
Figure 10B:
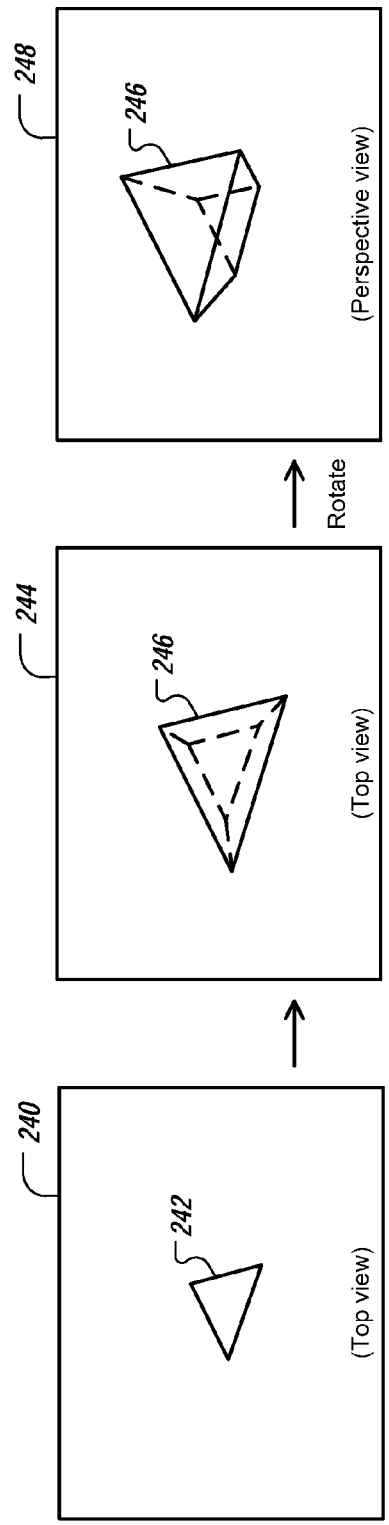

Referring to FIGS. 10A and 10B, a user can generate a frustum from a 2D object, such as a triangle, a square, a rectangle, a pentagon, a polygon, or a circle. FIG. 10A shows a sequence of finger movements that defines a 3D gesture input for generating a frustum having a triangular cross-section. FIG. 10B shows graph 240 that includes triangle 242, graph 244 that includes a top view of frustum 246, and graph 248 that includes a perspective view of frustum 246, as shown on display 102. The user can generate triangle 242 by providing a touch input having three touch points 250a, 250b, and 250c. The user lifts or pulls up 252 the three fingers at substantially the same time to a distance from display surface 118, in which the movement of the fingers are not entirely perpendicular to surface 118, pauses the fingers at locations that are not entirely above the touch points 250a to 250c, and spreads out 254 the fingers horizontally (or pauses for at least a predetermined period of time). These movements indicate a 3D gesture input that is associated with generating frustum 246 from triangle 242, in which frustum 246 has a bottom surface that corresponds to triangle 242 and a top surface defined by the locations of the three fingertips during pause. The height H (or thickness) of frustum 246 is proportional to the amount of movement of the fingertips perpendicular to surface 118.

Referring to FIGS. 11A and 11B, the CAD program can be configured to accept 3D gesture inputs to modify a 3D object by pulling out or pushing in portions of the 3D object. FIG. 11A shows a sequence of finger movements that defines a "pinch-and-pull" 3D gesture input for pinching and pulling out a portion of the surface of a 3D object. The user can touch display surface 118 at two touch points 260a and 260b, slide 262 the two fingers toward each other across display surface 118 as if pinching an object, and pull up 264 the two fingers substantially perpendicular to surface 118.

FIG. 11B shows a sequence of finger movements that defines a "pinch-and-push" 3D gesture input for pinching and pushing in a portion of the surface of a 3D object. The user can hover the two fingertips 270a and 270b above display surface 118, move 272 two fingers toward each other in substantially horizontal motions as if pinching an object, and push down 274 the two fingers substantially perpendicular to surface 118.

Figure 12:
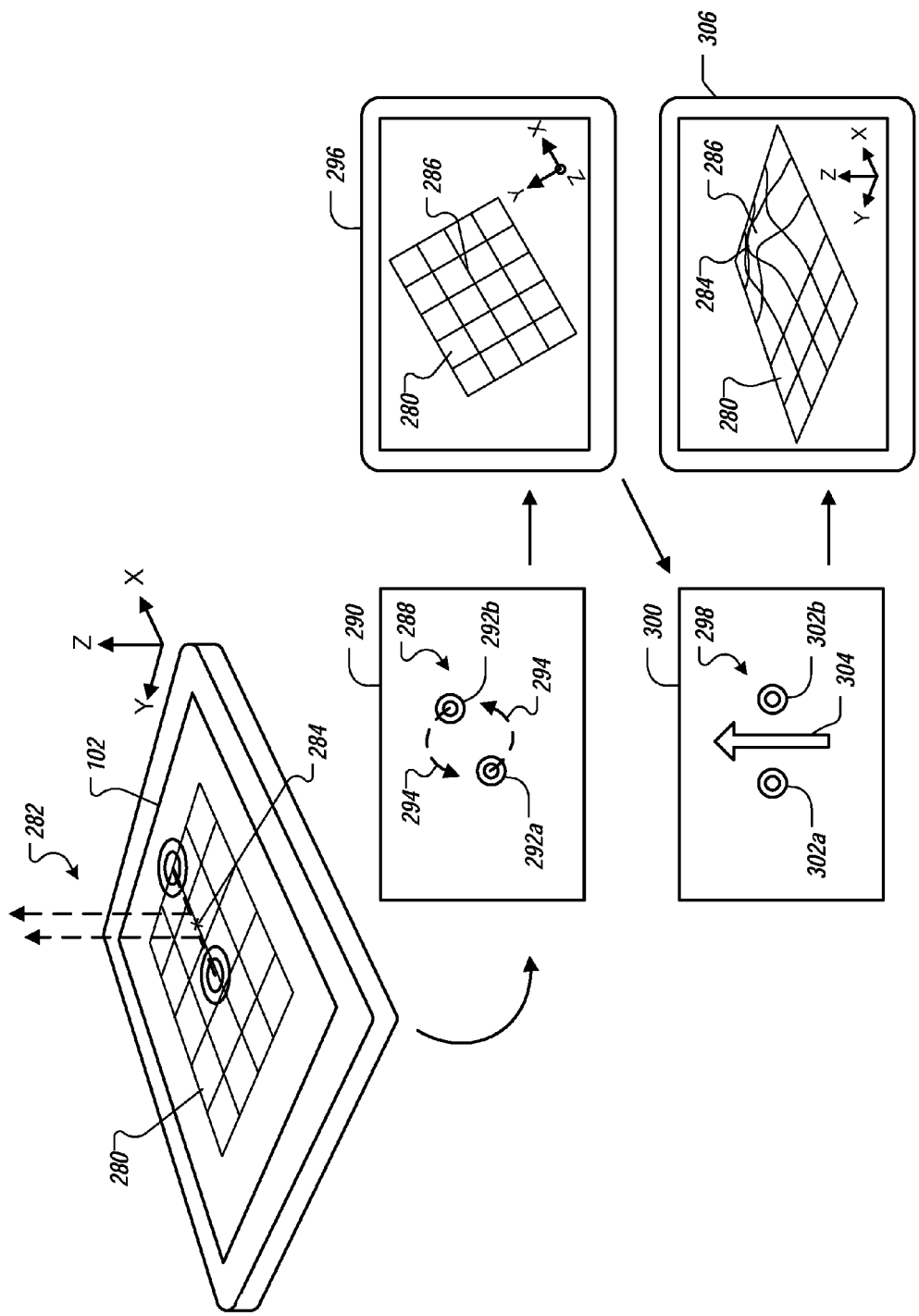

FIG. 12 shows a sequence of gesture inputs for generating a raised portion on a surface. Assume that surface 280 represented by a mesh has been generated and a top view of surface 280 is shown on display 102. The user can apply pinch-and-pull gesture input 282 to location 284 on surface 280 to cause location 284 to be "pulled up" to form raised portion 286, in which location 284 becomes the highest point of raised portion 286.

Surface 280 initially can be either a 2D object or a 3D object. If surface 280 is initially a 2D object, when the pinch-and-pull gesture input is applied to the 2D surface, the 2D surface is transformed into a 3D surface having a raised portion. The width of raised portion 286 can be defined by a sliding ruler, or by another gesture input. For example, the user can use the left hand to provide a touch input that includes two touch points in the input area 108 (FIG. 1). The distance between the two touch points defines the width at half height of raised portion 286. For example, if the height of raised portion 286 is H, then the width of raised portion at height H/2 will be equal to the distance between the two touch points in input area 108. Raised portion 286 can have a mathematically defined surface profile, such has having a cross-sectional profile (for example, along the x-z or y-z plane) resembling a Gaussian curve or other curves.

For example, the user can change the distance between the two touch points in input area 108 while pulling up the fingers in the pinch-and-pull gesture input 282 to modify the cross sectional profile (along the x-y plane) of raised portion 286 at various heights.

When the user pulls up the fingers, the user initially sees a top view of surface 280, including raised portion 286. The user can apply rotation gesture input 288 (as shown in graph 290) to rotate surface 280 along the axis that is perpendicular to display surface 118. Here, the z-axis is perpendicular to display surface 118, so rotation gesture input 288 causes surface 280 to rotate about the z-axis. Rotation gesture input 288 includes touching display surface 118 at two touch points 292a and 292b, and sliding the fingertips in a circular motion 294. The user sees rotated surface 280 as shown in graph 296.

The user can apply a second rotation gesture input 298 (as shown in graph 300) to further rotate surface 280. Rotation gesture input 298 includes two touch points 302a and 302b that define an axis (which passes touch points 302a and 302b), and a swipe motion 304 that defines the direction of rotation about the axis defined by touch points 302a and 302b. Here, rotation gesture input 298 causes surface 280 to rotate about the axis, allowing the user to see a perspective view of surface 280 having raised portion 286, as shown in graph 306.

A surface (for example, of an object or a landscape) can be modified in various ways to generate complicated 3D shapes or landscapes. For example, the user can applying gesture inputs to define the cross-sectional shape of a raised portion. The user can first draw a shape, such as a triangle, rectangle, circle, or an arbitrary shape, then apply the pinch-and-pull gesture input to generate a raised portion having a cross-sectional profile that correspond to the shape previously drawn. The pinch-and-pull motion may have to be applied to the drawn shape within a predetermined period of time (for example, one-half of a second), so that the CAD program understands that the pinch-and-pull motion is to be applied to the shape that was previously drawn. Otherwise, the CAD program may interpret drawing the object and the pinch-and-pull gesture input as two unrelated events.

For example, the user can apply the gesture inputs shown in FIGS. 3A, 4A, 5A, 6A, 7A, 8A, 9A, and 10A to generate a raised portion that resembles a triangular prism, a rectangular prism, a cylinder, an arbitrary shaped frustum having equal top and bottom surfaces, a pyramid having a triangular base, a pyramid having a rectangular base, a cone, and a frustum having top and bottom surfaces with different shapes and/or sizes, respectively.

Figure 13:
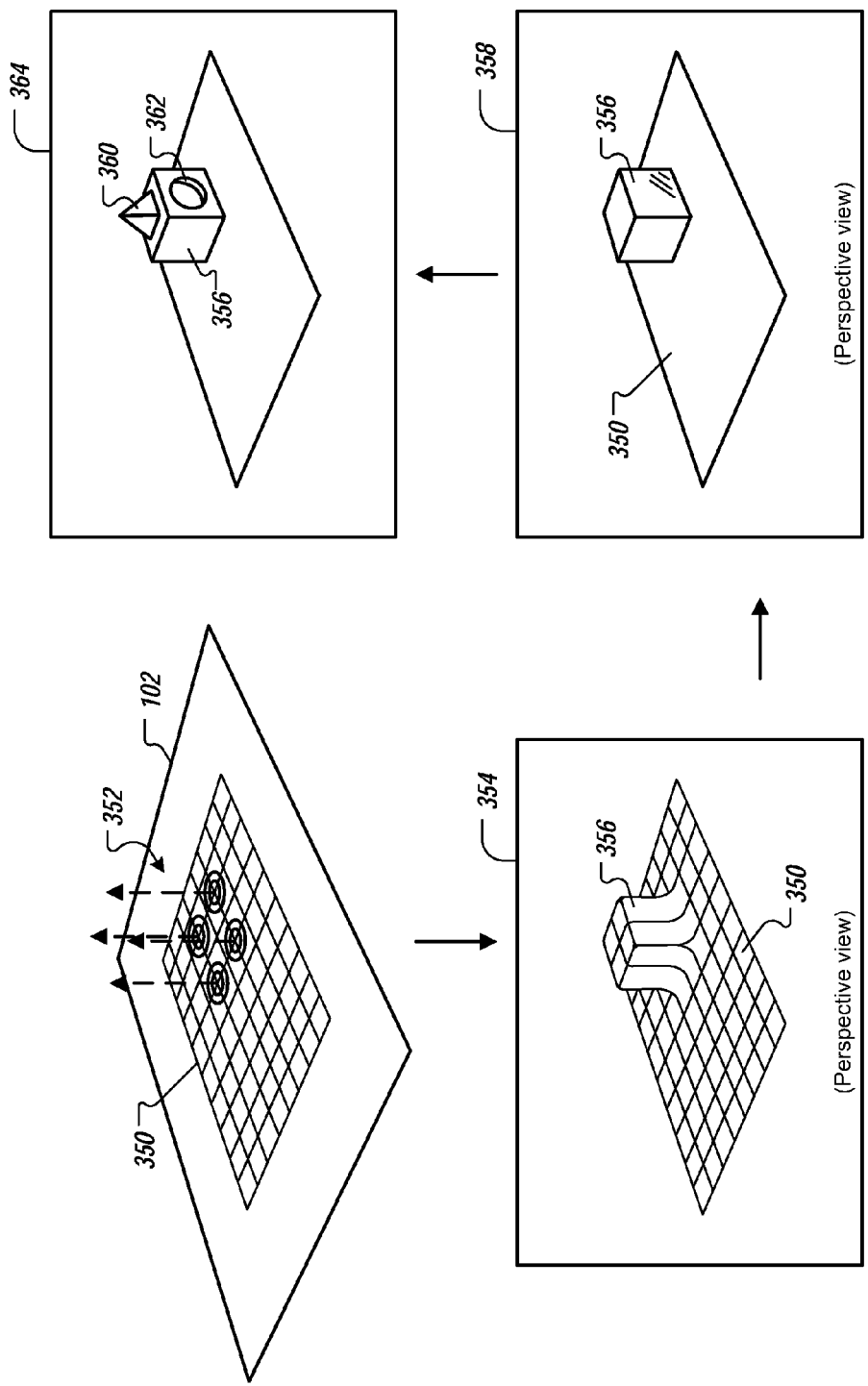

FIG. 13 shows a sequence of gesture inputs for generating a raised portion having a rectangular cross section on a surface. Assume that surface 350 represented by a mesh has been generated and a top view of surface 350 is shown on display 102. The user can apply touch-and-pull gesture input 352 to surface 350 with four touch points to pull up a portion of surface 350 to form raised portion 356 that has a rectangular cross section. When the user raises the fingers to pull up the rectangular raised portion 356, display 102 initially shows a top view of surface 350 including raised portion 356. The user can rotate surface 350 to obtain a perspective view of surface 350 including raised portion 356, as shown in graph 354. The user can enter a command to change the mesh view to a solid view, as shown in graph 358.

The surfaces of raised portion 356 can be further modified, such forming additional raised portion 360 on a surface of raised portion 356.

The CAD program can provide an "invert" option for generating a recess or impression in a surface, in which the shape of the recess corresponds to the shape of the 3D object associated with a gesture input. For example, a user can provide gesture inputs for raising a circular portion of a surface, followed by selection of the invert option, to form a recessed portion having a circular cross section, such as recessed portion 362 on a surface of raised portion 356, as shown in graph 364. For example, the invert option can be selected using menus 106 or by providing gesture inputs in input area 108.

Using the method described above, the user can form raised or recessed portions of any shape on the surface of any 3D object. For example, the user can form raised and recessed portions on the surface of a sphere to represent mountains and valleys on a globe.

In some implementations, the CAD program may provide the option of allowing the user to raise a portion of a surface by first drawing a shape on the surface, then using the pinch-and-pull gesture input to pull up the surface to form a raised portion having a cross section corresponding to the shape previously drawn. Similarly, the user can draw a shape on the surface, then using the pinch-and-push gesture input to push down the surface to form a recessed portion having a cross section corresponding to the shape previously drawn.

The CAD program may allow the user to apply color and texture to surfaces of objects. The proximity sensor of device 102 may be used to allow the user to conveniently select different mixtures of color or texture components by adjusting the distances of different fingers relative to display surface 118.

Figure 14:
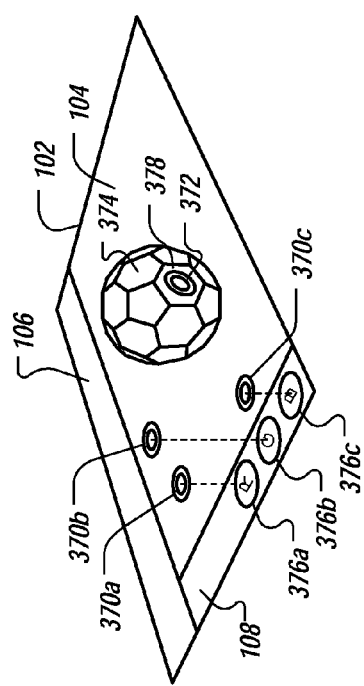

For example, referring to FIG. 14, the CAD program may designate regions 376a, 376b, and 376c in input area 108 for controlling red, green, and blue colors, respectively. The user may provide touch input 372 to surface 378 of object 374 shown in draft area 104 to select surface 378, and place three fingers above regions 376a, 376b, and 376c to control the color of surface 378. The relative heights of the fingertips 370a, 370b, and 370c above regions 376a, 376b, and 376c, respectively, indicate the relative weights of the red, green, and blue colors in the color of surface 378. For example, pulling up the fingertip 370b will increase the green component in the color of surface 378, and pushing down fingertip 370c will decrease the blue component in the color of surface 378.

Confirming the selection of the weights of the color components can be achieved in various ways. For example, the user may touch a small portion of area 378 (so as not to obscure the entire area 378 while the color of area 378 is being adjusted) and maintain contact with area 378 while using 3D gesture inputs to adjust the weights of the color components. When the user finds the desired color, the fingertip may be lifted off area 378, and the last values of the red, green, and blue color components while the fingertip still contacted area 378 are selected. As an alternative, the user may hover fingertips above the regions 376a, 376b, and 376c for a predetermined amount of time to indicate adjustment of the color components. After adjusting the red, green, and blue color components, the user can tap anywhere in input area 108 to confirm selection of the weights for the red, green, and blue color components.

Controlling the relative weights or portions of the red, green, and blue colors can also be achieved by using three slide bars, each slide bar controlling one of the red, green, and blue colors. The advantage of using the technique shown in FIG. 14 is that the area occupied by regions 376a, 376b, and 376c can be made smaller than the area needed for three slide bars. This is useful when the screen size is small, such as when display 102 is part of a portable device, such as a mobile phone, personal digital assistant, game console, or digital camera.

Figure 15A:
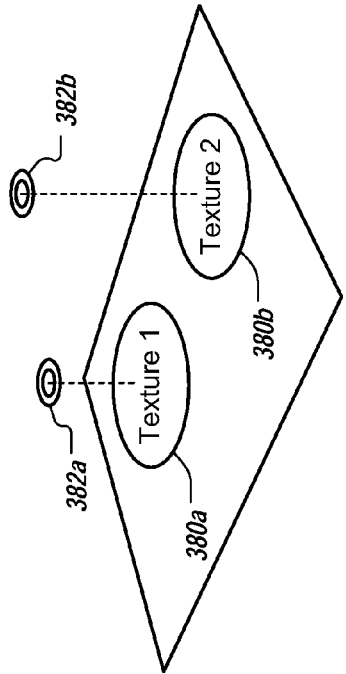

FIG. 15A shows an example in which the CAD program designates regions 380a and 380b in input area 108 for use in controlling relative weight of a first texture and a second texture applied to a selected surface of an object. The user can control blending of two textures by adjusting relative heights of fingertips 382a and 382b above regions 380a and 380b, respectively. For example, pulling up fingertip 382b will cause the second texture to be given more weight when applied to the selected surface.

Figure 15B:
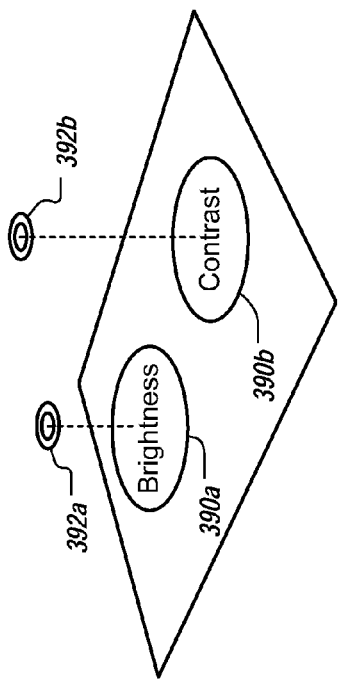

FIG. 15B shows an example in which the CAD program designates regions 390a and 390b in input area 108 for use in controlling brightness and contrast, respectively, of a selected region or surface of an object. The user can control brightness and contrast by adjusting heights of fingertips 392a and 392b above regions 390a and 390b, respectively. For example, pulling up fingertip 392b will increase contrast, and pushing down fingertip 392a will decrease brightness.

Figure 16:
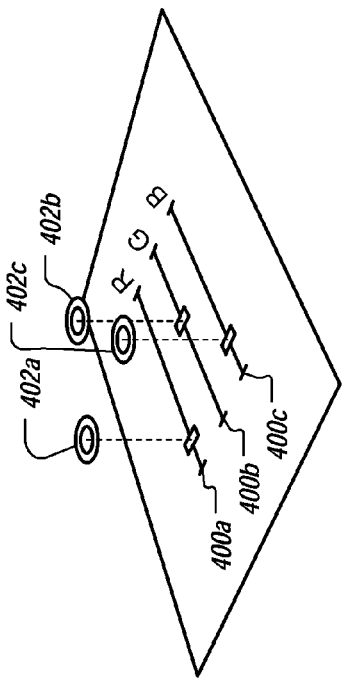

FIG. 16 shows an example in which the CAD program accepts 3D gesture inputs for controlling hue, saturation, and brightness. Slide bars 400a, 400b, and 400c are provided for controlling the red, green, and blue color components, thereby controlling hue. The user can adjust the average height of fingertips 402a, 402b, and 402c to control brightness. The user can adjust the relative heights of fingertips 402a and 402c to control saturation. For example, if fingertip 402a is much higher than fingertip 402c, the saturation is low, if fingertip 402a is the same height as fingertip 402c, the saturation is medium, and if fingertip 402a is much lower than fingertip 402c, the saturation is high.

The CAD program may provide an option to allow the user to select the position of a light source by moving a fingertip in the vicinity of display surface 118. The center of display surface 118 may correspond to a reference point in a virtual 3D environment, and the position of the fingertip relative to the center of display surface 118 may control the position of a light source in the virtual 3D environment relative to the reference point. The CAD program may continuously update the shadows and lighting effects on the virtual 3D environment and the 3D objects as the user moves the fingertip relative to display surface 118, until the user confirms selection of the position of the light source. The CAD program may allow the user to adjust the positions of multiple light sources by tracking the positions of multiple fingertips relative to the reference point.

The CAD program may allow the user to select a 2D editing mode for generating and modifying 2D objects, and a 3D editing mode for generating and modifying 3D objects.

The user can switch between the 2D and 3D editing modes to, for example, modify the shapes of 3D objects (in the 3D editing mode) and draw patterns on the surfaces of the 3D objects (in the 2D editing mode).

FIG. 17 shows a sequence of gesture inputs that can be used for generating a 3D dice. Square 342 shown on display 102 can be extruded using 3D gesture input 300 to form cube 302, similar to the method shown in FIGS. 4A and 4B. After rotation of cube 302, a perspective view of cube 302 is shown on display 102. A touch input 304 is provided to select surface 306 of cube 302. The user enters a command to switch to 2D editing mode. Surface 306 is shown on display 102. The user draws round dot 308 on surface 306. Round dot 308 can also be a 3D raised or recessed dot.

The user enters a command to switch back to 3D editing mode, such that a perspective view of cube 302 is shown on display 102. Touch input 310 is provided to select surface 312 of cube 302. The user enters a command to switch to 2D editing mode. Surface 312 is shown on display 102. The user draws two round dots 314 on surface 312. The user enters a command to switch back to 3D editing mode.

A touch input 316 is provided to select surface 318 of cube 302. The user enters a command to switch to 2D editing mode. Surface 318 is shown on display 102. The user draws three round dots 320 on surface 318. The user enters a command to switch back to 3D editing mode. Cube 302 with surfaces 306, 312, and 318 are shown on display 102. The user provides a rotation gesture input 320 to rotate cube 302 to show blank surface 322. A touch input 324 is provided to select surface 322. The user enters a command to switch to 2D editing mode. Surface 322 is shown on display 102. The user draws four round dots 324 on surface 322. The user enters a command to switch back to 3D editing mode.

A perspective view of cube 302 with surfaces 306, 312, and 322 is shown on display 102. The user provides a rotation gesture input 324 to rotate cube 302 to show blank surface 326. A touch input 328 is provided to select surface 326. The user enters a command to switch to 2D editing mode. Surface 326 is shown on display 102. The user draws six round dots 330 on surface 326. The user enters a command to switch back to 3D editing mode.

A perspective view of cube 302 with surfaces 312, 322, and 326 is shown on display 102. The user provides a rotation gesture input 332 to rotate cube 302 to show blank surface 334. A touch input 336 is provided to select surface 334. The user enters a command to switch to 2D editing mode. Surface 334 is shown on display 102. The user draws five round dots 338 on surface 334. The user enters a command to switch back to 3D editing mode, upon which completed 3D dice 340 is shown on display 102.

In some implementations, there may be other 3D gesture inputs. For example, a 3D gesture input can be provided for use in bending an object. Two touch points may define an axis, and pushing down or pull up two fingers on two sides of the axis may represent a gesture input for pushing or pulling an object toward the axis and bending the object about the axis.

For example, 3D gesture inputs may be used to compress or stretch an object. The user may "pinch" an object at two points (for example, a pinching action can be indicated by moving two fingers toward each other in the vicinity of display surface 118), such as by using two right-hand fingers to pinch the object at a first location and using two left-hand fingers to pinch the object at a second location. The two left-hand fingers and the two right-hand fingers can move toward each other to compress the object, move away from each other to stretch the object, or move in directions that are not aligned with each other to applying a shearing force to the object. The movements of the fingers can be in the 3D space in the vicinity of display surface 118.

2D gesture inputs can be applied to 3D objects. For example, the objects can be moved by touching (and thereby selecting) and dragging the objects. The size of an object can be increased by using two fingers to touch the object and sliding the two fingers away from each other on display surface 118. The size of the object can be decreased by sliding the two fingers toward each other (pinching gesture) on display surface 118. The 3D object can be vector-based, such that the size and/or shape of the 3D object can be changed without loss of resolution (for example, smooth surfaces and sharp edges can be maintained).

In some implementations, the CAD program may provide a "sculpting" mode in which 3D objects have properties as if made of clay, and finger movements are interpreted as sculpting 3D objects made of clay. The user may adjust properties of the clay, such as softness of the clay, during the sculpting process. Display 102 may show a reference plane with an object on the plane. The plane corresponds to display surface 118, and finger movements relative to display surface 118 will be applied the object as if the object were placed on display surface 118. This way, the frame of reference for interpreting the 3D gesture inputs remains stationary regardless of changes in the orientations of the reference plane shown in display 102. For example, an upward finger movement will be interpreted as applying a force in the +Z direction to an object, even though display 102 may show the object and the reference plane oriented such that the +Z direction points downward in display 102.

Depending on the finger movements, indentations may be formed in the object and portions of the object may be squeezed smaller while other portions may be enlarged (as if the clay material were squeezed from one region to another). When the pinch-and-pull gesture input is applied to an object having clay-like properties, pulling a portion of the object for a distance beyond a threshold may cause the portion to break off from the main body, just like pulling a portion off a lump of clay. A "pinch-twist-and-pull" gesture input can also be used to twist and break off a portion from the main body of an object.

In the sculpting mode, the CAD program can provide an option for rotating an object being sculpted, so that finger movements can be interpreted as being applied to a rotating object, similar to sculpting a rotating clay pot placed on a potter's wheel.

The CAD program may provide an "erase" mode, in which waving a finger back and forth about a location on the surface of an object will gradually remove portions of the object near the location, as if rubbing away material from the object. A "growth" mode may be provided, in which waving a finger back and forth about a location on the surface of an object will cause material to gradually grow near the location, as if rubbing material onto the object.

Because display 102 is two-dimensional, while finger movements are three-dimensional, the CAD program may provide pointers to show which portions of the object are selected or being manipulated. Alternatively, the portions being manipulated can be highlighted, for example, shown with a different brightness or color. For example, when a pinch gesture is applied to a portion of the object, the pinched portion may become highlighted. When a sculpting gesture is applied to an object, the portion of the object receiving the sculpting force can be highlighted. This allows the user to manipulate the objects more accurately.

Various gesture inputs can be used to render complex 3D objects. For example, a product design house can use device 100 to quickly generate 3D models of consumer products. Video game developers can use device 100 to quickly generate 3D models of figures in video games. Users can use device 100 to quickly generate avatars for use in video conferencing applications. User of a virtual 3D environment can quickly generate or modify avatars or objects in the virtual 3D environment. Homeowners can generate 3D models of their houses based on aerial photographs, and add the 3D models to a map application. By providing a convenient and intuitive way to generate and modify 3D objects based on 2D objects in photographs, a 3D model of a community or an entire city can be generated through the cooperation of the residents of the community or city, each individual using device 100 to modify computer-generated 3D models of buildings or landscapes that the individual is familiar with.

In some implementations, the CAD program can provide an option for drawing mountains. Fingertip movements in the vicinity of display surface 118 can be interpreted to be tracing the ridge line of a mountain. The CAD program can generate a virtual mountain automatically using mathematical models, in which the virtual mountain has ridge lines that correspond to the fingertip movements. The user can further modify the virtual mountain using various gesture inputs.

When generating or modifying 3D objects or 3D virtual environments, voice commands can be used in parallel to touch and gesture inputs. The user can provide voice commands such as "start" and "end" to indicate the start and end, respectively, of a gesture input. The user can provide voice commands such as "circle mode," "sculpting mode," or "erase mode" to select the circle mode, sculpting mode, or erase mode, respectively.

In addition to generating and modifying 3D objects, 3D gesture inputs can be used to manipulate the movements of 3D object in a virtual 3D environment. For example, a 3D gesture input may impart an initial speed to an object according to a force represented by the 3D gesture input. A faster finger movement toward the object may represent a greater force pushing the object. The object may have certain physical properties, such as mass and surface friction coefficients. The object may move about in the virtual 3D environment according to physical properties associated with the 3D object and the environment.

For example, display 100 may show a ball on a surface. A 3D gesture input that represents pushing the ball may cause the ball to start rolling on the surface. The ball may slow down depending on the friction coefficients assigned to the ball and the surface, and whether the path on the surface slopes upward or downward.

Computer games that require players to move objects may utilize 3D gesture inputs. For example, finger movements in the vicinity of display surface 118 may be used to guide movements of objects through 3D mazes. For example, in a baseball video game, a user can use finger movements to control movements of a bat, in which swinging a finger forward and away from display surface 118 causes the bat to swing forward and upwards, and swinging the finger forward and toward display surface 118 causes the bat to swing forward and downwards.

In some implementations, the shape of a 3D object can be represented by mesh lines that are defined according to movements in 3D gesture inputs. For example, in the example shown in FIG. 12, the mesh lines representing the surface 280 and raised portion 286 can be drawn by the user in the 3D space in the vicinity of display surface 118. If the fingertip maintains a constant distance to display surface 118 when drawing the mesh lines, the mesh lines will form a plane surface. If the fingertip moves up and away from display surface 118 at a location when drawing the mesh lines, there will be a raised portion at the location on the surface represented by the mesh lines. If the fingertip moves down and toward display surface 118 at the location when drawing the mesh lines, there will be a recessed portion at the location on the surface represented by the mesh lines.

The CAD program may provide a free-style 3D drawing mode in which finger movements in the three-dimensional space in the vicinity of display surface 118 represent 3D line drawings. For example, moving a fingertip in a spiral motion in the vicinity of display surface 118 may be used to draw a 3D spiral.

In some implementations, the CAD program may allow the user to define a 3D object that represents a virtual controller or a virtual tool that can be used to control other objects or change the properties of other objects. For example, a virtual trackball can be generated and used to control movement of other objects. The virtual trackball can be placed at a location on display 102 and can be controlled by the user by applying a hand gesture in the vicinity of the location of display 102 similar to a gesture used for rotating a physical trackball.

The touch inputs, 2D gesture inputs, and 3D gesture inputs for generating and modifying virtual 3D objects and virtual 3D environments can be used in applications other than CAD programs. For example, a word processing program may provide the functionality to allow a user to select a segment of text and "pull up" the selected text to generate 3D text. The touch and gesture inputs can be applied to 3D widgets.

An operating system may represent windows in a 3D environment, and the gesture inputs can be used to manipulate the 3D windows. For example, a user can generate a cube using the touch-and-pull-up gesture, then drag an application program to a face of the cube so that the face becomes the window for the application program. The user can rotate the cube and drag five additional application programs to the other five faces of the cube so that each face of the cube represents a window to an application program. The user can selectively view an application program by rotating the cube so that the face hosting the application program faces the user.

The operating system may show the desktop as a 3D surface, and the touch and gesture inputs can be used to modify the 3D desktop. For example, the system tray and various icons for application programs may be shown as if lying on a 3D landscape. The operation system may allow the user to apply special effects to a 3D window, such as forming raised or recessed portions. An application program executing in the modified 3D window will have the effect as if the application program is projected onto a screen that has raised or recessed portions.

For example, 3D gesture inputs can be different from those described above. Additional 3D gesture inputs can be defined for generating additional 3D shapes or manipulating 3D objects in additional ways. A 3D object is generated (436) in a user interface based on the 3D gesture input and at least one of the touch input or 2D gesture input. For example, the 3D object can include the 3D object shown in FIG. 3B, 4B, 5B, 6B, 7B, 8B, 9B, 10B, 12, 13, or 17.

Figure 18:
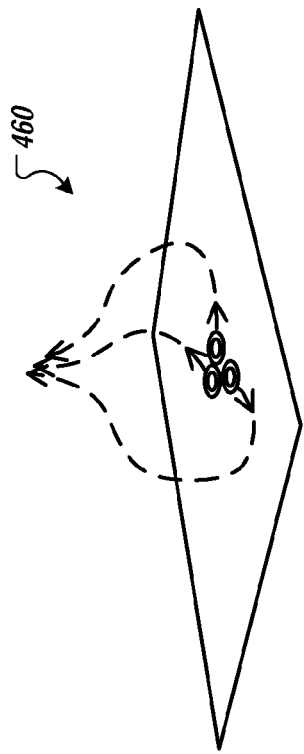

For example, referring to FIG. 18, 3D gesture input 440 for generating a sphere may include touching display surface 118 at touch point 446, drawing a first circle 442 on display surface 118, and drawing a second circle 444 along a plane orthogonal to the plane of display surface 118. The diameter of the sphere may correspond to the diameter of first circle 442, and the center of the sphere may either be above the center of first circle 442 or above touch point 446.

Figure 19A:
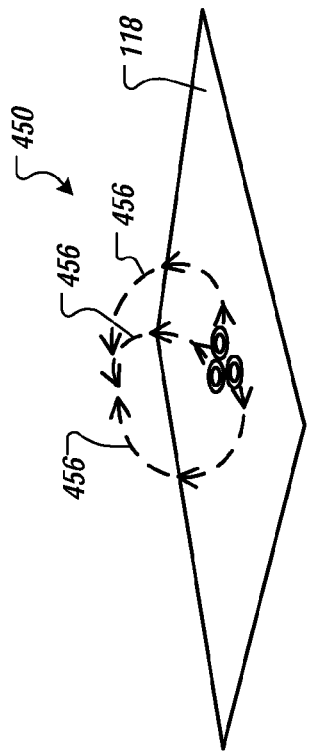
Figure 19B:
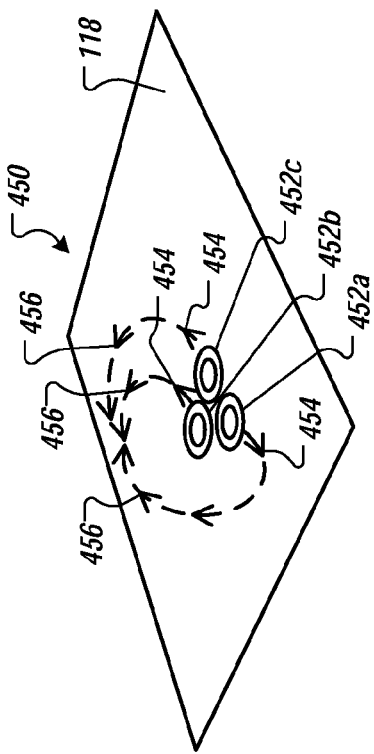

Alternatively, referring to FIGS. 19A and 19B (which provides different views of the same 3D gesture input), 3D gesture input 450 for generating a sphere may include touching display surface 118 at three touch points 452a, 452b, and 452c, with three fingers that are close together. The three fingers spread out and slide 454 on display surface 118 for a short distance, then the fingers are lifted off display surface 118 and move 456 along arcs as if the fingers are tracing the surface of a sphere. The fingers come close together at a location above the initial touch points 452a, 452b, and 452c, as if pausing at the top of the sphere.

Figure 20:
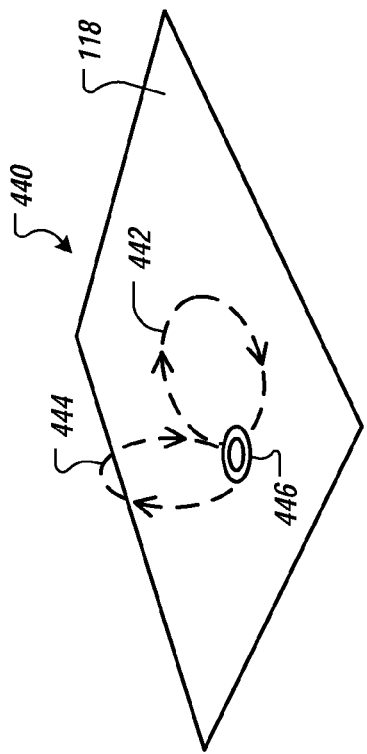

Referring to FIG. 20, 3D gesture input 460, which is a variation of 3D gesture input 450, can be used to generate 3D objects that resemble chocolate drops. In 3D gesture input 460, when the three fingers are lifted off display surface 118 and come close together, the fingers move along arcs in which the directions of the arc curvatures change near the top of the 3D object to cause a pointed tip to form at the top of the 3D object, similar to the tip of a chocolate drop.

In the description above, the touch inputs, 2D gesture inputs, and 3D gesture inputs are detected by touch sensors and proximity sensors embedded in display 102. In some implementations, the touch sensors and proximity sensors can be a single sensor, such as a capacitive touch sensor. In some implementations, the capacitive touch sensor can detect a capacitance that is inversely proportional to the distance between the finger and a surface (e.g., display surface 118 or another surface). The change in capacitance detected can be sent to the touch model configured for 3D mode and the 3D gesture can be determined based on the value of the capacitance. The finger capacitance acts as one plate of the capacitor and the surface is the other plate. The capacitance is inversely proportional to the distance between the finger and the surface, so as the user moves the finger vertically above the touch surface the capacitance decreases. This allows a 3D touch model to interpret the distance d of the finger above the touch surface and select the appropriate 3D touch event based on the value of the capacitance. The capacitance can be detected by the capacitive touch sensor and sent to the touch model. If the capacitance is lower than the capacitance at a reference position, then a 3D touch event has occurred. The reference capacitance can be the capacitance when the finger is touching the surface. Processor can detects the reference capacitance, and a drop in capacitance signals a 3D touch event.

The touch inputs, 2D gesture inputs, and 3D gesture inputs can also be provided to a touch-sensitive surface of device 100, such as a trackpad or touchpad, in which touch sensors and proximity sensors are embedded in the trackpad or touchpad. The gesture inputs for generating, modifying, and manipulating 3D objects and virtual 3D environments described above can also be applied to the touch-sensitive surface.

In some implementations, display 102 can be a 3D display that can show 3D images to the user. The 3D display can be an autostereoscopic display that uses lenticular lenses or parallax barriers. The 3D display can provide images having different polarizations intended for left or right eyes, and can be viewed by users wearing polarized 3D glasses. The 3D display can be a volumetric 3D display. The surface display 102 can be non-planar, such as dome shaped or cylindrical. The touch sensors and proximity sensors embedded in the display can conform to the exterior shape of the display surface. For example, display 102 can show 3D images of 3D objects, and the user can apply 3D gesture inputs in which the user's fingers appear as if touching the 3D objects.

Processes for Generating, Modifying, and Manipulating 3D Objects

Figure 21:
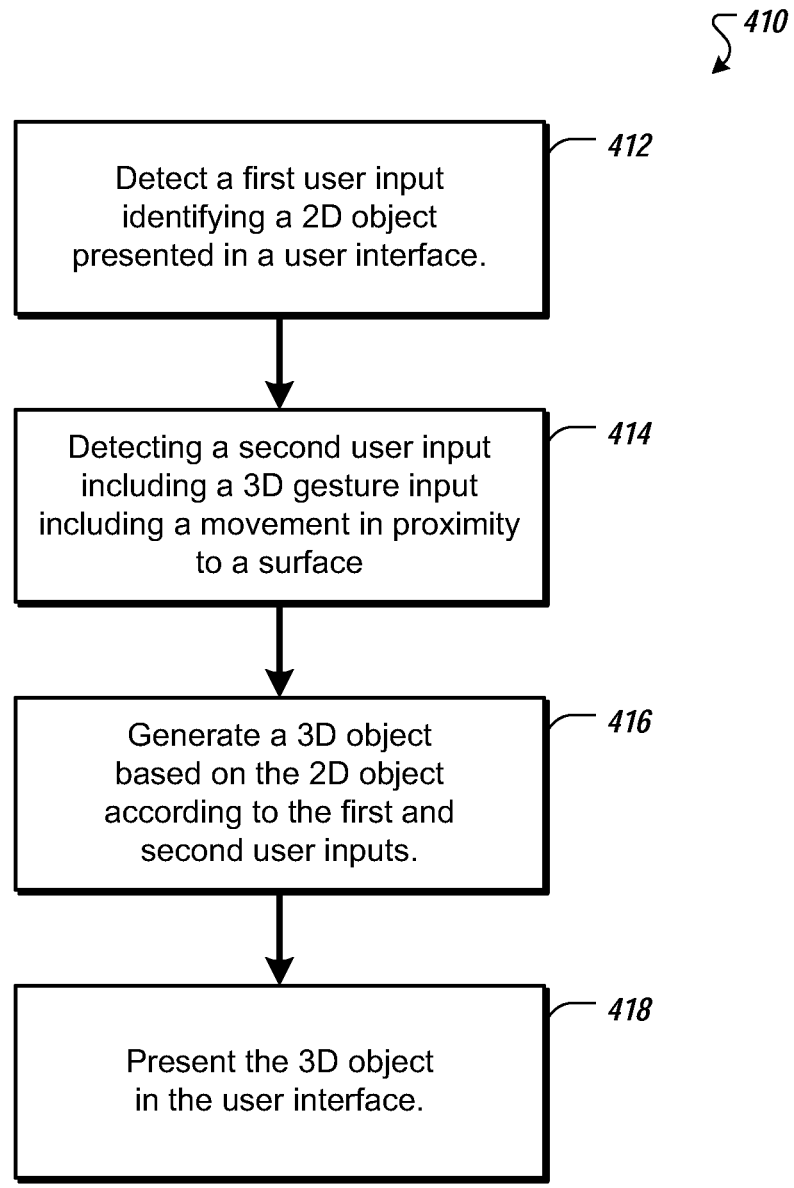
FIGS. 21 to 23 are exemplary flow diagrams according to various embodiments of the invention.

FIG. 21 is a flow diagram of example process 410 for generating 3D objects. For example, process 410 can be implemented using device 102. In process 410, a first user input identifying a 2D object presented in a user interface is detected (412). For example, the user interface can be display 102, and the 2D object can be a triangle, a square, or any other 2D shape.

A second user input including a 3D gesture input including a movement in proximity to a surface is detected (414). For example, the 3D gesture input can include pulling up the fingers as shown in FIG. 3A, 4A, 5A, 6A, 7A, 8A, 9A, or 10A, the pinch-and-pull gesture input as shown in FIG. 11A, or the pinch-and-push gesture input as shown in FIG. 11B.

A 3D object is generated (416) based on the 2D object according to the first and second user inputs. For example, the 3D object can be a triangular prism (FIG. 3B), a rectangular prism (FIG. 4B), a cylinder (FIG. 5B), an arbitrary shaped frustum having equal top and bottom surfaces (FIG. 6B), a pyramid having a triangular base (FIG. 7B), a pyramid having a rectangular base (FIG. 8B), a cone (FIG. 9B), a frustum having top and bottom surfaces with different shapes and/or sizes (FIG. 10B), or an object having a raised or recessed surface (FIGS. 12 and 13).

The 3D object is presented (418) in the user interface.

Figure 22:
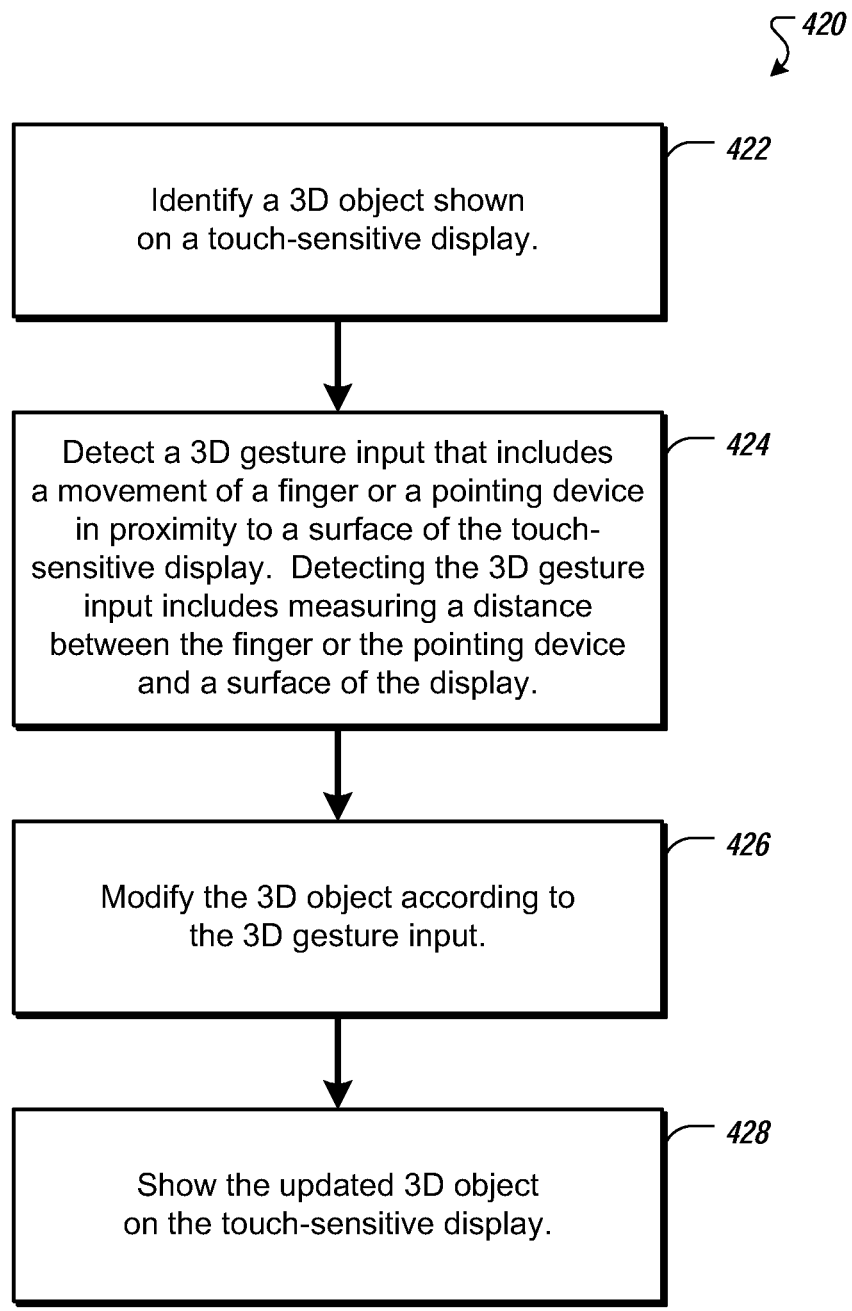

FIG. 22 is a flow diagram of example process 420 for modifying 3D objects. For example, process 420 can be implemented using device 102. In process 420, a 3D object is shown (422) on a touch-sensitive display. For example, the touch-sensitive display can be display 102 that includes touch sensors.

A 3D gesture input that includes a movement of a finger or a pointing device in proximity to a surface of the touch-sensitive display is detected (424). Detecting the 3D gesture input can include measuring a distance between the finger or the pointing device and a surface of the display. For example, the touch-sensitive display can include proximity sensors, and the pointing device can be a stylus.

The 3D object is modified (426) according to the 3D gesture input. For example, a raised or recessed portion can be formed on a surface of a 3D object, as shown in FIGS. 12 and 13. Color, texture, or lighting applied to a surface of the 3D object can be controlled by the 3D gesture input, as shown in FIGS. 14, 15A, 15B, and 16.

The updated 3D object is shown (428) on the touch-sensitive display.

Figure 23:
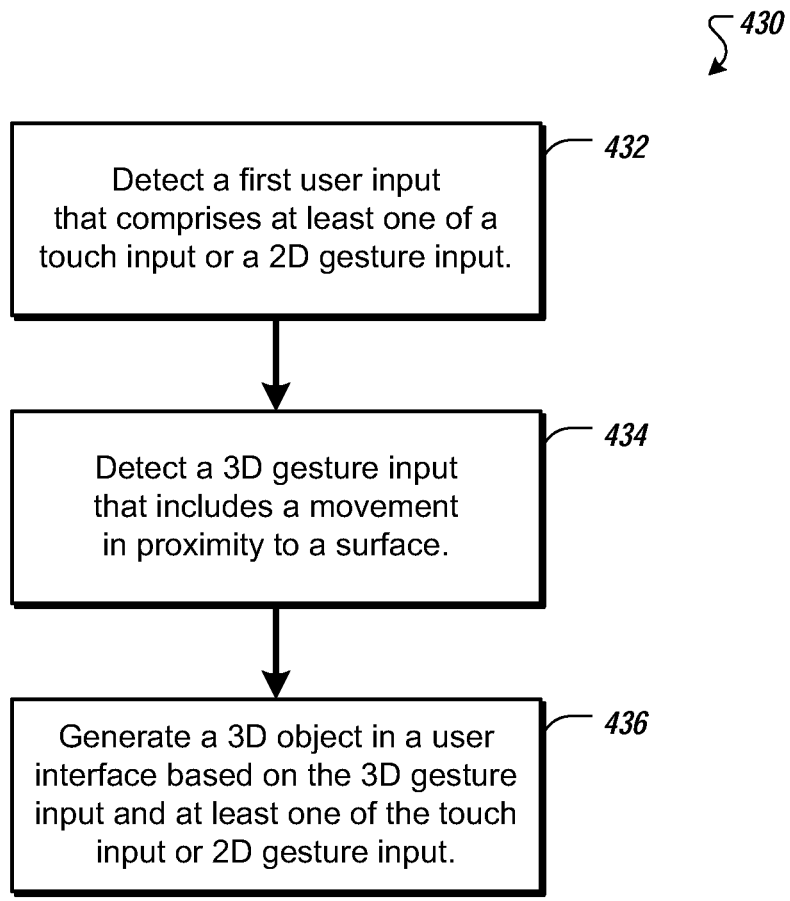

FIG. 23 is a flow diagram of example process 430 for generating 3D objects. For example, process 430 can be implemented using device 102. In process 430, a first user input that includes at least one of a touch input or a 2D gesture input is detected (432). For example, the touch input can be touching display surface 118 at two or more touch points, as shown in FIG. 3A, 4A, 5A, 7A, 8A, 9A, 10A, or 11A. The 2D gesture input can include sliding one or more fingers on display surface 118, as shown in FIG. 6A or 11A.

A 3D gesture input that includes a movement in proximity to a surface is detected (434). For example, the 3D gesture input can include finger movements such as those shown in FIG. 3A, 4A, 5A, 6A, 7A, 8A, 9A, 10A, 11A, 11B, 12, 13, or 17.

Example Device Architecture

The following provides more details on the implementation of device 100 and its components. For example, touch-sensitive display 102 can implement liquid crystal display (LCD) technology, light emitting polymer display (LPD) technology, or some other display technology. In addition, device 100 can include a touch-sensitive surface (e.g., a trackpad or touchpad).

In some implementations, touch-sensitive display 102 can include a multi-touch-sensitive display. A multi-touch-sensitive display can, for example, process multiple simultaneous points of input, including processing data related to the pressure, degree, and/or position of each point of input. Such processing facilitates gestures and interactions with multiple fingers, chording, and other interactions. Other touch-sensitive display technologies can also be used, e.g., a display in which contact is made using a stylus or other pointing device.

A user can interact with device 100 using various touch inputs, e.g., when a user touches touch sensitive display 102. Gesture inputs can also be derived from multiple touch inputs, e.g., where a user moves his or her finger (or other input tool) across touch sensitive display 102. An example gesture input is a swipe input, where a user swipes his or her finger (or other input tool) across touch-sensitive display 102. In some implementations, the device can detect inputs that are received in direct contact with display 102, or that are received within a particular distance of display 102 (e.g., within one or two inches along a direction perpendicular to surface of display 102). Users can simultaneously provide input at multiple locations on display 102. For example, inputs simultaneously touching at two or more locations can be received.

In some implementations, device 100 can display one or more graphical user interfaces on touch-sensitive display 102 for providing the user access to various system objects and for conveying information to the user. In some implementations, the graphical user interface can include one or more display objects, e.g., display objects 122 and 128.

In some implementations, device 100 can implement various device functionalities. As part of one or more of these functionalities, device 100 presents graphical user interfaces on touch-sensitive display 102 of device 100, and also responds to touch input received from a user, for example, through touch-sensitive display 102. For example, a user can invoke various functions by launching one or more applications on the device. The applications can include, for example, a CAD program.

Figure 24:
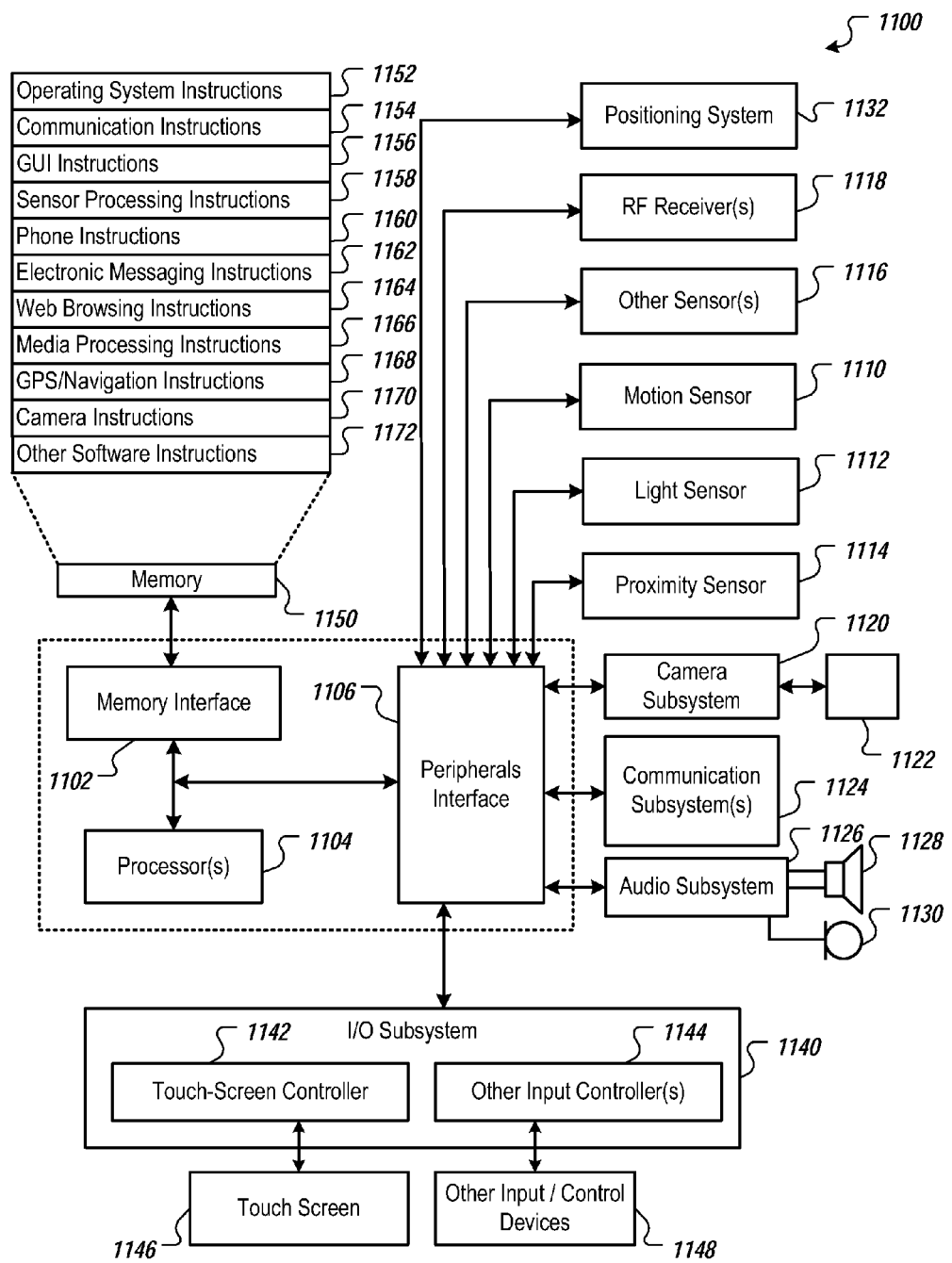
FIG. 24 is a block diagram of an example hardware architecture of a device for generating, modifying, and manipulating 3D objects based on 3D gesture inputs.

FIG. 24 is a block diagram of example hardware architecture of device 1100 for generating, modifying, and manipulating 3D objects using 3D gesture inputs. Device 1100 can include memory interface 1102, one or more data processors, image processors and/or central processing units 1104, and peripherals interface 1106. Memory interface 1102, one or more processors 1104 and/or peripherals interface 1106 can be separate components or can be integrated in one or more integrated circuits. The various components in device 1100 can be coupled by one or more communication buses or signal lines.

Sensors, devices, and subsystems can be coupled to peripherals interface 1106 to facilitate multiple functionalities. For example, motion sensor 1110, light sensor 1112, and proximity sensor 1114 can be coupled to peripherals interface 1106 to facilitate various orientation, lighting, and proximity functions. For example, in some implementations, light sensor 1112 can be utilized to facilitate adjusting the brightness of touch screen 1146. In some implementations, motion sensor 1111 (e.g., an accelerometer, velicometer, or gyroscope) can be utilized to detect movement of the device. Accordingly, display objects and/or media can be presented according to a detected orientation, e.g., portrait or landscape.

Other sensors 1116 can also be connected to peripherals interface 1106, such as a temperature sensor, a biometric sensor, or other sensing device, to facilitate related functionalities.

Location determination functionality can be facilitated through positioning system 1132. Positioning system 1132, in various implementations, can be a component internal to device 1100, or can be an external component coupled to device 1100 (e.g., using a wired connection or a wireless connection). In some implementations, positioning system 1132 can include a GPS receiver and a positioning engine operable to derive positioning information from received GPS satellite signals. In other implementations, positioning system 1132 can include a compass (e.g., a magnetic compass) and an accelerometer, as well as a positioning engine operable to derive positioning information based on dead reckoning techniques. In still further implementations, positioning system 1132 can use wireless signals (e.g., cellular signals, IEEE 802.11 signals) to determine location information associated with the device. Hybrid positioning systems using a combination of satellite and television signals, such as those provided by ROSUM CORPORATION of Mountain View, Calif., can also be used. Other positioning systems are possible.

Broadcast reception functions can be facilitated through one or more radio frequency (RF) receiver(s) 1118. An RF receiver can receive, for example, AM/FM broadcasts or satellite broadcasts (e.g., XM® or Sirius® radio broadcast). An RF receiver can also be a TV tuner. In some implementations, RF receiver 1118 is built into wireless communication subsystems 1124. In other implementations, RF receiver 1118 is an independent subsystem coupled to device 1100 (e.g., using a wired connection or a wireless connection). RF receiver 1118 can receive simulcasts. In some implementations, RF receiver 1118 can include a Radio Data System (RDS) processor, which can process broadcast content and simulcast data (e.g., RDS data). In some implementations, RF receiver 1118 can be digitally tuned to receive broadcasts at various frequencies. In addition, RF receiver 1118 can include a scanning function which tunes up or down and pauses at a next frequency where broadcast content is available.

Camera subsystem 1120 and optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 1124. Communication subsystem(s) can include one or more wireless communication subsystems and one or more wired communication subsystems. Wireless communication subsystems can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving and/or transmitting data. The specific design and implementation of communication subsystem 1124 can depend on the communication network(s) or medium(s) over which device 1100 is intended to operate. For example, device 1100 may include wireless communication subsystems designed to operate over a global system for mobile communications (GSM) network, a GPRS network, an enhanced data GSM environment (EDGE) network, 802.x communication networks (e.g., Wi-Fi, WiMax, or 3G networks), code division multiple access (CDMA) networks, and a Bluetooth™ network. Communication subsystems 1124 may include hosting protocols such that device 1100 may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 1126 can be coupled to speaker 1128 and one or more microphones 1130. One or more microphones 1130 can be used, for example, to facilitate voice-enabled functions, such as voice recognition, voice replication, digital recording, and telephony functions.

I/O subsystem 1140 can include touch screen controller 1142 and/or other input controller(s) 1144. Touch-screen controller 1142 can be coupled to touch screen 1146. Touch screen 1146 and touch screen controller 1142 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch screen 1146 or proximity to touch screen 1146.

Other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of speaker 1128 and/or microphone 1130.

In one implementation, a pressing of the button for a first duration may disengage a lock of touch screen 1146; and a pressing of the button for a second duration that is longer than the first duration may turn power to device 1100 on or off. The user may be able to customize a functionality of one or more of the buttons. Touch screen 1146 can, for example, also be used to implement virtual or soft buttons and/or a keyboard.

In some implementations, device 1100 can present recorded audio and/or video files, such as MP3, AAC, and MPEG files. In some implementations, device 1100 can include the functionality of an MP3 player, such as an iPhone™.

Memory interface 1102 can be coupled to memory 1150. Memory 1150 can include high-speed random access memory and/or non-volatile memory, such as one or more magnetic disk storage devices, one or more optical storage devices, and/or flash memory (e.g., NAND, NOR). Memory 1150 can store operating system 1152, such as Darwin, RTXC, LINUX, UNIX, OS X, WINDOWS, or an embedded operating system such as VxWorks. Operating system 1152 may include instructions for handling basic system services and for performing hardware dependent tasks. In some implementations, operating system 1152 can be a kernel (e.g., UNIX kernel).

Memory 1150 may also store communication instructions 1154 to facilitate communicating with one or more additional devices, one or more computers and/or one or more servers. Communication instructions 1154 can also be used to select an operational mode or communication medium for use by the device, based on a geographic location (obtained by GPS/Navigation instructions 1168) of the device. Memory 1150 may include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GPS/Navigation instructions 1168 to facilitate GPS and navigation-related processes and instructions, e.g., mapping a target location; camera instructions 1170 to facilitate camera-related processes and functions; and/or other software instructions 1172 to facilitate other processes and functions, e.g., security processes and functions, device customization processes and functions (based on predetermined user preferences), and other software functions. Memory 1150 may also store other software instructions (not shown), such as web video instructions to facilitate web video-related processes and functions; and/or web shopping instructions to facilitate web shopping-related processes and functions. In some implementations, media processing instructions 1166 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 1150 can include additional instructions or fewer instructions. Furthermore, various functions of device 1100 may be implemented in hardware and/or in software, including in one or more signal processing and/or application specific integrated circuits.

Example Network Operating Environment for Devices

Figure 25:
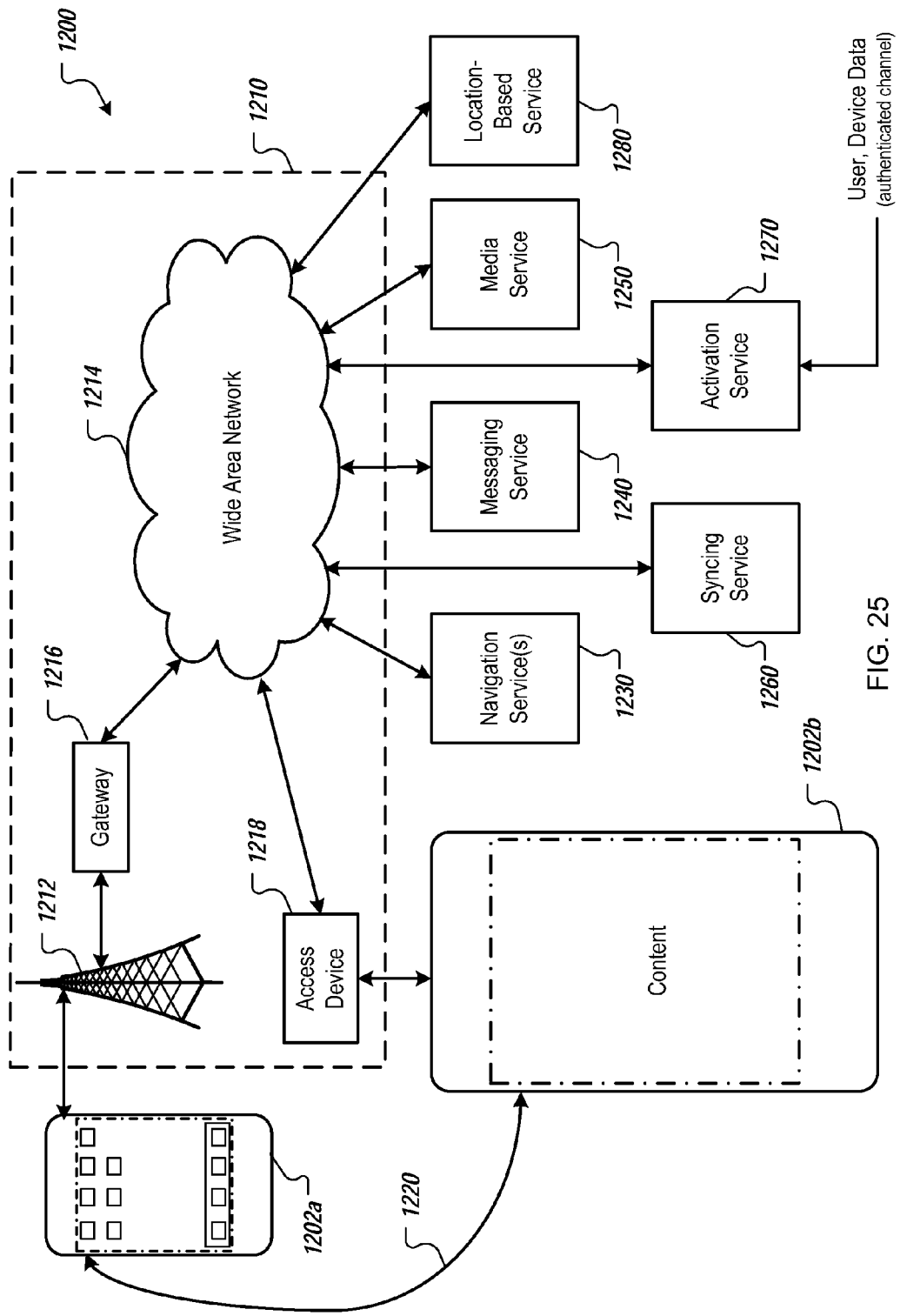
FIG. 25 is a block diagram of an example network operating environment for devices for generating, modifying, and manipulating 3D objects based on 3D gesture inputs.

FIG. 25 is a block diagram of example network operating environment 1200 for devices for generating, modifying, and manipulating 3D objects using 3D gesture inputs. Devices 1202a and 1202b can, for example, communicate over one or more wired and/or wireless networks 1210 in data communication. For example, wireless network 1212, e.g., a cellular network, can communicate with a wide area network (WAN) 1214, such as the Internet, by use of gateway 1216. Likewise, access device 1218, such as an 802.11g wireless access device, can provide communication access to wide area network 1214. In some implementations, both voice and data communications can be established over wireless network 1212 and access device 1218. For example, device 1202a can place and receive phone calls (e.g., using VoIP protocols), send and receive e-mail messages (e.g., using POP3 protocol), and retrieve electronic documents and/or streams, such as web pages, photographs, and videos, over wireless network 1212, gateway 1216, and wide area network 1214 (e.g., using TCP/IP or UDP protocols). Likewise, in some implementations, device 1202b can place and receive phone calls, send and receive e-mail messages, and retrieve electronic documents over access device 1218 and wide area network 1214. In some implementations, devices 1202a or 1202b can be physically connected to access device 1218 using one or more cables and access device 1218 can be a personal computer. In this configuration, device 1202a or 1202b can be referred to as a "tethered" device.

Devices 1202a and 1202b can also establish communications by other means. For example, wireless device 1202a can communicate with other wireless devices, e.g., other devices 1202a or 1202b, cell phones, etc., over wireless network 1212. Likewise, devices 1202a and 1202b can establish peer-to-peer communications 1220, e.g., a personal area network, by use of one or more communication subsystems, such as a Bluetooth™ communication device. Other communication protocols and topologies can also be implemented.

Device 1202a or 1202b can also access other data and content over one or more wired and/or wireless networks 1210. For example, content publishers, such as news sites, RSS feeds, web sites, blogs, social networking sites, developer networks, etc., can be accessed by device 1202a or 1202b. Such access can be provided by invocation of a web browsing function or application (e.g., a browser) in response to a user touching, for example, a Web object.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or addition, the program instructions can be encoded on a propagated signal that is an artificially generated signal, e.g., a machine-generated electrical, optical, or electromagnetic signal, that is generated to encode information from transmission to suitable receiver apparatus for execution by a programmable processor.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
displaying a representation of a three-dimensional (3D) object on a touch-sensitive display;
detecting a gesture input that comprises a movement of a finger or a pointing device in proximity to a surface of the display, the detecting comprising measuring a distance between the finger or the pointing device and the surface of the display;
modifying the representation of the 3D object according to the gesture input; and
displaying the updated representation of the 3D object on the touch-sensitive display.

2. The method of claim 1, further comprising detecting at least one of a touch input or a second gesture input that comprises touching the surface of the touch-sensitive display, and modifying the representation of the 3D object according to a combination of the first gesture input and at least one of the touch input or the second gesture input.

3. The method of claim 1 in which modifying the representation of the 3D object comprises modifying at least one of size, shape, orientation, or position of the representation of the 3D object according to the movement in the gesture input.

4. The method of claim 1 in which modifying the representation of the 3D object comprises at least one of sculpting the representation of the 3D object, stretching the representation of the 3D object, compressing the representation of the 3D object, removing portions from the representation of the 3D object, adding portions to the representation of the 3D object, or taking apart portions of the representation of the 3D object according to the movement in the gesture input.

5. The method of claim 1, further comprising presenting the representation of the 3D object in a virtual 3D environment, imparting an initial speed to the representation of the 3D object according to a force represented by the gesture input, and moving the representation of the 3D object in the virtual 3D environment according to physical properties associated with the 3D object and the environment.

6. The method of claim 1, comprising detecting a touch input comprising two touch points that define an axis, and
modifying the representation of the 3D object comprises rotating the representation of the 3D object about the axis in a direction determined according to the movement in the gesture input.

7. The method of claim 1, comprising detecting a touch input that defines a reference point, and
modifying the representation of the 3D object comprises modifying the representation of the 3D object according to the movement in the gesture input relative to the reference point.

8. The method of claim 1 in which detecting the gesture input comprises detecting positions of a portion of at least one of a finger or a pointing device in three dimensions relative to the surface of the display over a period of time.

9. A computer-implemented method, comprising:
detecting, on a touch-sensitive surface, a first user input that comprises at least one of a touch input or a first gesture input;
detecting a second gesture input that comprises a movement in proximity to the touch-sensitive surface, in which a portion of the movement is performed at a distance from the touch-sensitive surface; and
generating a representation of a three-dimensional (3D) object in a user interface based on the second gesture input and at least one of the touch input or first gesture input, the representation of the 3D object having a property that depends at least in part on the portion of the movement performed at a distance from the surface.

10. The method of claim 9 in which generating the representation of the 3D object comprises defining a shape of the representation of the 3D object according to the movement in the gesture input.

11. The method of claim 10 in which defining the shape of the representation of the 3D object comprises defining the shape of a mesh object having mesh lines defined according to movements in the gesture input.

12. The method of claim 10 in which generating the representation of the 3D object comprises drawing 3D lines or patterns in a 3D environment.

13. The method of claim 9 in which detecting the gesture input comprises detecting positions of a portion of at least one of a finger or a pointing device in three dimensions relative to the surface.

14. The method of claim 9 in which the representation of the 3D object represents a virtual tool that can be used to change properties of other objects presented in the user interface, and the method further comprises detecting a second gesture input and controlling the virtual 3D tool according to the second gesture input.

15. The method of claim 9 in which the property of the representation of the 3D object comprises a height or thickness of the 3D object.

16. A method comprising:
detecting a gesture input that comprises a movement starting from a touch-sensitive surface and ending at a distance in proximity to the touch-sensitive surface, in which a portion of the movement is performed at a distance from the touch-sensitive surface; and
modifying a value of a parameter based on the gesture input, the value of the parameter depending at least in part on the portion of the movement performed at a distance from the touch-sensitive surface.

17. The method of claim 16 in which modifying a parameter based on the gesture input comprises modifying a parameter of a representation of an object shown on a display.

18. The method of claim 17 in which modifying a parameter of a representation of an object comprises modifying at least one of a dimension, color, or texture of the representation of the object.

19. The method of claim 16, comprising identifying the end of the gesture input by detecting a pause in the movement for a predetermined period of time.

20. The method of claim 16, comprising identifying the end of the gesture input by detecting a pause in the movement for a predetermined period of time, followed by a second movement indicating the end of the gesture.

21. The method of claim 16, comprising identifying the end of the first gesture input by detecting a second gesture input that indicates the end of the first gesture input.

22. A method comprising:
detecting a plurality of gesture inputs, each gesture input comprising a movement starting from a touch-sensitive surface and ending at a distance in proximity to the touch-sensitive surface; and
assigning weights to parameters based on the plurality of gesture inputs, the weights depending at least in part on relative values of the distances at which the gesture input movements end.

23. The method of claim 22 in which assigning weights to parameters comprises assigning weights to different colors or different textures.

24. The method of claim 22 in which detecting a plurality of gesture inputs comprises detecting positions of portions of a plurality of fingers in three dimensions relative to the touch-sensitive surface over a period of time.

25. An apparatus comprising:
a sensor module to detect gesture inputs each comprising a movement having a component in a direction perpendicular to a surface; and
a data processor to receive signals output from the sensor module, the signals representing detected gesture inputs, and generate or modify a representation of a three-dimensional (3D) object in a user interface according to the detected gesture inputs, in which the representation of the 3D object has a property that depends at least in part on the gesture input movement in the direction perpendicular to the surface.

26. The apparatus of claim 25, further comprising a display to show the representation of the 3D object, and
wherein the sensor module comprises a proximity sensor to detect movements in proximity to the surface of the display.

27. The apparatus of claim 25, further comprising a storage device to store information about a mapping between the movement in proximity to the surface and predefined gestures.

28. The apparatus of claim 27 in which the sensor module comprises a touch sensor and a proximity sensor, the touch sensor detecting touch inputs and gesture inputs having movements along the surface, the proximity sensor in combination with the touch sensor detecting gesture inputs having the perpendicular movement components.

29. The apparatus of claim 27 in which the sensor module comprises a capacitive based touch sensor that can detect touch inputs, gesture inputs having movements along the surface, and gesture inputs having the perpendicular movement components.

30. The apparatus of claim 25 in which the property of the representation of the 3D object comprises a height or thickness of the representation of the 3D object.

31. An apparatus comprising:
   a computer storage medium storing instructions that, when executed by data processing apparatus, cause the data processing apparatus to perform operations comprising:
      displaying a representation of a three-dimensional (3D) object on a touch-sensitive display;
      detecting a gesture input that comprises a movement of a finger or a pointing device in proximity to a surface of the display, the detecting comprising measuring a distance between the finger or the pointing device and the surface of the display;
      modifying the representation of the 3D object according to the gesture input; and
      displaying the updated representation of the 3D object on the touch-sensitive display.

\* \* \* \* \*